US009120888B2

(12) United States Patent
Karjala et al.

(10) Patent No.: US 9,120,888 B2
(45) Date of Patent: Sep. 1, 2015

(54) FUNCTIONALIZED OLEFIN INTERPOLYMERS, COMPOSITIONS AND ARTICLES PREPARED THEREFROM AND METHODS FOR MAKING THE SAME

(75) Inventors: Teresa P. Karjala, Lake Jackson, TX (US); Selim Yalvac, Pearland, TX (US); Benjamin R. Rozenblat, Belle Mead, NJ (US); Cynthia L. Rickey, Lake Jackson, TX (US); Steven A. Wells, Lebanon, NJ (US)

(73) Assignee: Dow Global Technologies LLC, Midland, MI (US)

( * ) Notice: Subject to any disclaimer, the term of this patent is extended or adjusted under 35 U.S.C. 154(b) by 306 days.

(21) Appl. No.: 12/299,490

(22) PCT Filed: Jun. 11, 2007

(86) PCT No.: PCT/US2007/070876
§ 371 (c)(1),
(2), (4) Date: Apr. 3, 2009

(87) PCT Pub. No.: WO2007/146875
PCT Pub. Date: Dec. 21, 2007

(65) Prior Publication Data
US 2010/0160497 A1 Jun. 24, 2010

Related U.S. Application Data

(60) Provisional application No. 60/813,854, filed on Jun. 15, 2006.

(51) Int. Cl.
C08L 23/06 (2006.01)
C08F 255/02 (2006.01)
C08F 8/00 (2006.01)
C08F 255/00 (2006.01)
C09J 151/06 (2006.01)
C08L 51/06 (2006.01)

(52) U.S. Cl.
CPC ............... *C08F 255/02* (2013.01); *C08F 8/00* (2013.01); *C08F 255/00* (2013.01); *C09J 151/06* (2013.01); *C08L 51/06* (2013.01); *C08L 2205/02* (2013.01)

(58) Field of Classification Search
CPC ............................ C09J 151/06; C08L 51/06
USPC ............... 524/284, 585; 525/327.4, 329.5
See application file for complete search history.

(56) References Cited

U.S. PATENT DOCUMENTS

| | | | |
|---|---|---|---|
| 4,039,560 A | 8/1977 | Tomoshige et al. | |
| 4,070,316 A | 1/1978 | Combs et al. | |
| 4,452,942 A | 6/1984 | Shida et al. | |
| 4,481,262 A | 11/1984 | Shida et al. | |
| 4,762,890 A | 8/1988 | Strait et al. | |
| 4,806,594 A | 2/1989 | Gross et al. | |
| 4,908,411 A | 3/1990 | Kinoshita et al. | |
| 4,927,888 A * | 5/1990 | Strait et al. | 525/285 |
| 4,966,810 A | 10/1990 | Strait et al. | |
| 5,045,401 A | 9/1991 | Tabor et al. | |
| 5,064,802 A * | 11/1991 | Stevens et al. | 502/155 |
| 5,066,542 A | 11/1991 | Tabor et al. | |
| 5,093,418 A * | 3/1992 | Kinoshita et al. | 525/64 |
| 5,266,627 A | 11/1993 | Meverden et al. | |
| 5,498,809 A | 3/1996 | Emert et al. | |
| 5,705,565 A | 1/1998 | Hughes et al. | |
| 5,741,594 A * | 4/1998 | Jialanella | 428/424.2 |
| 5,741,858 A | 4/1998 | Brann et al. | |
| 5,824,718 A | 10/1998 | Penfold et al. | |
| 5,994,474 A | 11/1999 | Wey et al. | |
| 6,043,401 A | 3/2000 | Bagheri et al. | |
| 6,048,935 A | 4/2000 | Penfold et al. | |
| 6,111,027 A | 8/2000 | Wright et al. | |
| 6,172,015 B1 | 1/2001 | Emert et al. | |
| 6,299,985 B1 | 10/2001 | Zhang et al. | |
| 6,335,410 B1 | 1/2002 | Finlayson et al. | |
| 6,375,863 B1 * | 4/2002 | Tachikawa et al. | 252/299.01 |
| 6,395,791 B1 | 5/2002 | Chaudhary et al. | |
| 6,414,102 B2 | 7/2002 | Chung et al. | |
| 6,479,590 B1 | 11/2002 | Ikeda et al. | |
| 6,583,188 B2 | 6/2003 | Chaudhary et al. | |

(Continued)

FOREIGN PATENT DOCUMENTS

EP 0183493 A2 6/1986
EP 0353935 A1 2/1990

(Continued)

OTHER PUBLICATIONS

Zhang, Y. et al., "Preparation and Characterization of Functionalized Polyethylene Waxes" Suliao Gongye Bianjibu. 2003, p. 13-15, 18; 31(2) (Chinese Publication) Abstract.
"Polar Pe Wax Couples Natural Fibers in HDPE" Mar. 2006, Plastics Technology-Online Article Abstract.
PCT/US07/070876 Intl Search Report and Written Opinion.

*Primary Examiner* — Ling Choi
*Assistant Examiner* — Wenwen Cai

(57) ABSTRACT

The invention provides compositions containing at least one functionalized polyolefin, and in particular, to compositions containing at least one functionalized ethylene interpolymer, which has a melt viscosity less than 50,000 cP at 350° F. (177° C.) and a molecular weight distribution ($M_w/M_n$) from about 1 to 5. The invention also provides adhesive formulations containing the same. The invention also relates to the preparation of the functionalized interpolymers, by reacting, for example, such an ethylene interpolymer with the following: a) at least one unsaturated compound, containing at least one heteroatom, and b) at least one initiator.

12 Claims, 1 Drawing Sheet

(56) References Cited

U.S. PATENT DOCUMENTS

| | | |
|---|---|---|
| 6,583,222 B1 | 6/2003 | Chaudhary et al. |
| 2003/0114322 A1 | 6/2003 | Richter et al. |
| 2004/0054086 A1* | 3/2004 | Schauder et al. ............ 525/193 |
| 2005/0043455 A1 | 2/2005 | Hohner |
| 2006/0074171 A1 | 4/2006 | Bach et al. |
| 2008/0167421 A1* | 7/2008 | Yalvac et al. ................ 524/570 |

FOREIGN PATENT DOCUMENTS

| | | |
|---|---|---|
| EP | 0818525 A2 | 1/1998 |
| EP | 0850138 A1 | 7/1998 |
| EP | 0944670 A1 | 9/1999 |
| JP | 2000326461 A | 11/2000 |
| JP | 2004250702 A | 9/2004 |
| JP | 2004269609 A | 9/2004 |
| JP | 2006-052246 A | 2/2006 |
| WO | 90/01503 | 2/1990 |
| WO | 9413761 A1 | 6/1994 |
| WO | 9722471 A1 | 6/1997 |
| WO | 98/38245 | 9/1998 |
| WO | 9842760 A1 | 10/1998 |
| WO | 0236651 A1 | 5/2002 |
| WO | 03/040201 | 5/2003 |
| WO | 03/087178 | 10/2003 |
| WO | 03097722 A1 | 11/2003 |
| WO | 2004/031292 A2 | 4/2004 |
| WO | 2004/035680 A1 | 4/2004 |
| WO | 2005100501 | 10/2005 |
| WO | 2005111145 A1 | 11/2005 |
| WO | 2006069205 A1 | 6/2006 |
| WO | 2007008765 A2 | 1/2007 |

* cited by examiner

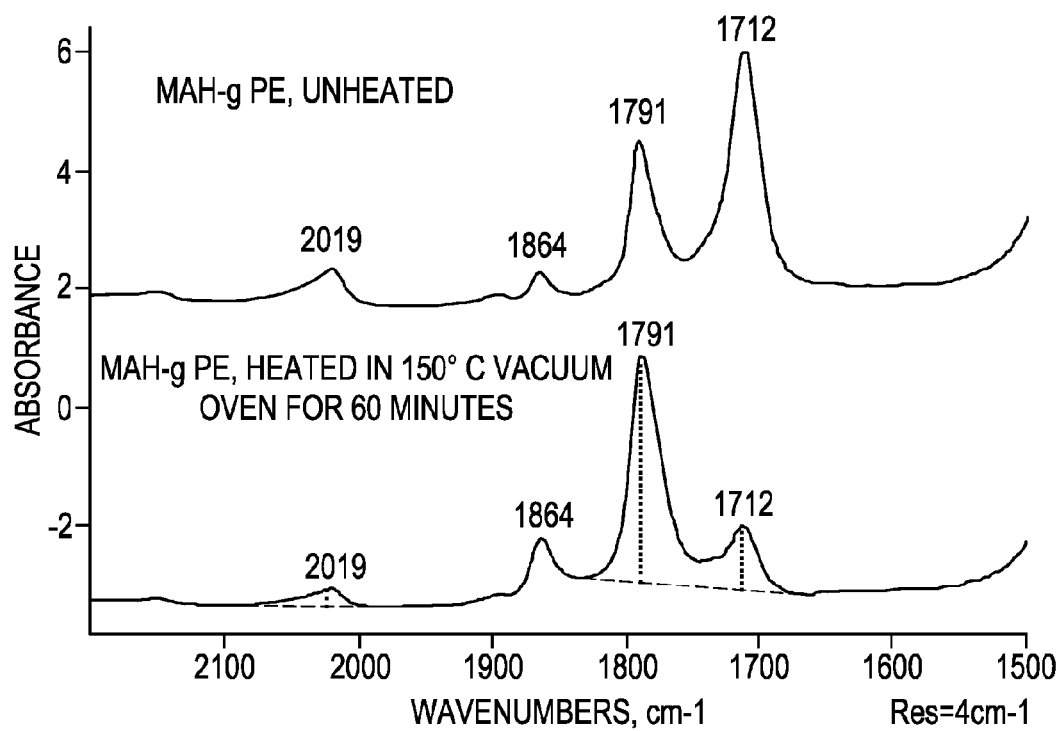

FUNCTIONALIZED OLEFIN INTERPOLYMERS, COMPOSITIONS AND ARTICLES PREPARED THEREFROM AND METHODS FOR MAKING THE SAME

REFERENCE TO RELATED APPLICATIONS

The present application is a 35 U.S.C. §371 national stage application of International Application No. PCT/US2007/070876, filed Jun. 11, 2007, which claims the benefit of U.S. Provisional Application No. 60/813,854, filed Jun. 15, 2006.

The subject invention relates to compositions containing functionalized polyolefin polymers, and in particular, functionalized ethylene interpolymers having a melt viscosity less than 50,000 cP at 350° F. (177° C.). The invention further relates to the preparation of useful adhesive formulations, other applications and articles made therefrom, and methods for making the same.

BACKGROUND OF THE INVENTION

There is a need for solvent-free, low viscosity, hot melt adhesive (HMA) and pressure sensitive adhesive (PSA) formulations, that maintain adhesive strength at high use temperatures (e.g., 104° F. (40° C.) and above).

U.S. Pat. No. 5,705,565 discloses relatively high molecular weight substantially linear ethylene polymers, for example, polyethylenes prepared by constrained geometry catalysis, which are grafted with one or more unsaturated organic compounds containing both ethylenic unsaturation and a carbonyl group, for example, maleic anhydride. These graft-modified substantially linear ethylene polymers impart desirable compatibility and impact properties to various thermoplastic polymer blends, and have adhesive properties.

U.S. Pat. No. 4,927,888 (see also U.S. Pat. No. 4,966,810 and U.S. Pat. No. 4,762,890) discloses maleic anhydride grafting reactions to polymers, at low pressures, by feeding the polymer through a multiple screw extruder, and injecting the maleic anhydride and a free radical initiator into the extruder. The maleic anhydride and initiator can be pre-mixed in a solvent solution. Between 0.75 and 2.0 weight percent of the graft copolymer comprises maleic anhydride. The graft copolymer can further be blended with an olefinic polymer to yield an adhesive thermoplastics suitable for use as food packaging multilayer coextruded films.

International Publication No. WO 98/38245 discloses a polyethylene composition comprising from 5 to 70 weight percent of a homogeneous ethylene/α-olefin interpolymer, from 30 to 95 weight percent of at least one filler, and from 0.1 weight percent to less than 10 weight percent of at least one functionalized polyethylene. Maleic anhydride grafted polyethylenes of relatively high molecular weights are used in the experimental examples.

International Publication No. WO 2005/100501 discloses an article comprising: 1) a functionalized component, 2) tackifier, and 3) an olefin polymer, comprising one or more C3 to C40 olefins, optionally one or more diolefins, and less than 5 mole of ethylene, and having a Dot T-Peel of one Newton or more, a branching index (g') of 0.95 or less, measured at the Mz of the polymer; and an Mw of 100,000 or less. The functional component is selected from the group consisting of functionalized polymers, functionalized oligomers and beta nucleating agents (see abstract).

International Publication No. WO 97/22471 (see also EP0873242B1) discloses a process for preparing a laminate comprising a first substrate (I) and a second substrate (II), which comprises an ethylene or propylene polymer, and which is bonded to the first substrate by means of a polymeric adhesive. The process comprises the steps of: A) applying to the first substrate (I) a primer comprising an organic solvent and an ethylene or propylene polymer, having grafted thereto, an unsaturated carboxylic acid or an anhydride, ester, amide, imide or metal salt thereof, and B) injection molding an ethylene or propylene polymer and optional additives onto the primed substrate (I).

International Publication No. WO 2004/035680 discloses highly filled polymer compositions comprising a low molecular weight ethylene and/or alpha olefin homopolymers and copolymers, or blends therefrom, filled with high concentrations of fillers or additives. Examples of such fillers or additives include fire retardants, talc, ceramic manufacturing agents, color concentrates, crosslinking agents, and blowing agents.

U.S. Pat. No. 5,066,542 discloses succinic acid or succinic anhydride grafts of HDPE, which are blended with LLDPE, for example, ethylene/1-octene copolymers, to form blends having useful adhesive properties at elevated temperatures. The succinic acid or succinic anhydride groups are provided by grafting, respectively, maleic acid or maleic anhydride onto the HDPE.

U.S. Pat. No. 4,039,560 discloses a method for producing a modified waxy ethylene polymer, which comprises: (a) polymerizing ethylene in an inert hydrocarbon solvent at 120° C.-250° C., and pressure ranging from the vapor pressure of the solvent at the polymerization temperature to 100 $kg/cm^2$, and using a catalyst composed of a halogen compound of titanium and/or vanadium to form a waxy ethylene polymer having a viscosity average molecular weight of 500 to 30000; (b) reacting an unsaturated polycarboxylic acid with the resulting waxy ethylene polymer in the presence of a peroxide at a temperature above the melting point of the waxy ethylene polymer and up to 250° C., and if desired, (c) contacting the ethylene polymer, before, or after, the reaction with the unsaturated polycarboxylic acid, with oxygen or a gas containing oxygen. Relatively high density polyethylenes are functionalized in the experimental examples.

U.S. Pat. No. 5,045,401 discloses multicomponent thermoplastic resin blends, which have a nonisothermal crystallization half life of less than thirty seconds. Especially preferred are three component resin blends comprising a maleic anhydride grafted HDPE of relatively high molecular weight, an unmodified LLDPE copolymer having a density between about 0.905 and 0.93 g/cc, and an unmodified LLDPE copolymer having a density between about 0.89 and 0.92 g/cc. These thermoplastic resin blends can be used as the adhesive layer in multilayer structures.

International Publication No. WO 03/087178 discloses an article of manufacture comprising a copolymer of ethylene and vinyl aromatic monomer having a molecular weight of less than 15,000. Preferably, the copolymer is characterized by a backbone having a first and second terminal end group, the first terminal end group is a methyl group, the second terminal end group is a vinyl group, and wherein the ratio of the terminal methyl group to the terminal vinyl group is 0.8:1 to 1:0.8. The article of manufacture includes, but is not limited to, waxes and lubricants.

U.S. Pat. No. 6,414,102 discloses polyolefin copolymers (I) and graft copolymers (II), which are prepared from the copolymers (I). The copolymers (I) are linear copolymers containing divinylbenzene comonomer units selected from the group consisting of 1,4-divinylbenzene units, mixtures of 1,4- and 1,3-divinylbenzene units, and mixtures of 1,4-, 1,3- and 1,2-divinylbenzene units. This patent discloses grafting reactions with styrene, p-methylstyrene and methylmethacrylate.

U.S. Pat. No. 6,299,985 discloses polyethylene-based adhesive compositions which contain as little as 5 weight percent, and up to 35 weight percent, of an acid-grafted metallocene polyethylene. The compositions are disclosed as having superior peel strength to comparable compositions containing an acid grafted non-metallocene and EVA or EMA polyethylene. Compositions containing an acid-grafted metallocene polyethylene component, based on a relatively high molecular weight metallocene polyethylene having a melt-flow ratio of less than 6.53, and an Mw/Mn of greater than the melt flow ratio less 4.63, can be used as an adhesive.

International Publication No. WO2007/008765 discloses compositions containing at least one silane-grafted polyolefin, and in particular, to compositions containing at least one silane-grafted ethylene/α-olefin polymer, which has a melt viscosity less than 50,000 cP, and adhesives containing the same. In one embodiment, the at least one silane-grafted ethylene/α-olefin polymer is formed from an ethylene/α-olefin polymer that has a molecular weight distribution from 1 to 3.5. The invention also relates to the preparation of the silane-grafted polymers, by reacting, for example, an ethylene/α-olefin polymer with at least one silane compound and at least one initiator.

International Publication No. WO 2006/069205 discloses an adhesive composition comprising a copolymer of propylene and at least one comonomer, selected from the group consisting of ethylene and C4-20 α-olefins. The copolymer has the following properties: (i) a content of units derived from propylene of greater than about 50 mole percent, (ii) a Brookfield viscosity at 190° C. from about 50 to about 100,000 cP, (iii) an MWD from about 1.5 to about 15, and (iv) a residual catalyst metal content less than about 50 ppm. The propylene copolymer may be functionalized with one or more compounds, including maleic anhydride.

International Publication No. WO 02/36651 discloses propylene ethylene copolymers with an ethylene content between 8 and 32 mole percent, and which have been grafted with maleic anhydride and a peroxide. The functionality level is higher than what is reported with polypropylene. Relatively high molecular weight polypropylenes are functionalized in the experimental examples.

*Preparation and Characterization of Functionalized Polyethylene Waxes*, Zhang et al., Suliao Gongye (2003), 31 (2), 13-15, 18 (Abstract), discloses the functionalization of polyethylene waxes by grafting maleic anhydride or maleic anhydride-styrene onto polyethylene waxes.

European Patent EP 0 850 138B1 discloses a laminate comprising: a) a first substrate comprising a first substantially linear olefin copolymer; b) an adhesion promoter, which comprises a "polar group functionalized" second substantially linear olefin copolymer; c) a tackifying resin admixed with the adhesion promoter, or an adhesive superposing the adhesion promoter or admixed therewith; and d) a second substrate adhesively bonded to the first substrate. Relatively high molecular weight functionalized ethylene-based polymers are used in the experimental examples.

International Publication No. WO 2004/031292 discloses a thermoplastic composition that comprises: (i) from 1 to 99 percent, by weight of the total composition, of at least one thermoplastic copolymer, for example, styrene block copolymers, and (ii) from 1 to 99 percent, by weight of the total composition, of at least one homogeneously branched ethylene/α-olefin interpolymer, for example ethylene/1-octene, having a density of less than, or equal to, 0.899 g/cc, and a Brookfield viscosity of greater than 500 cP (350° F.).

U.S. Pat. No. 6,335,410 (see also U.S. Pat. Nos. 6,054,544 and 6,723,810) discloses a non-pourable homogeneous ultralow molecular weight ethylene polymer composition, and a process for the preparation thereof. Such polymer compositions have longer lamella and a greater degree of crystalline organization, than corresponding higher molecular weight materials at an equivalent density.

International Publication No. WO 2005/111145 discloses propylene compositions comprising a propylene polymer, a substantially linear ethylene polymer, linear ethylene polymer or combinations thereof, a low molecular weight polymer, and optionally a filler. The compositions have improved processability, with a good balance of stiffness and toughness, and demonstrate improved scratch resistance in injection molded articles. The propylene polymer may be graft modified.

Additional functionalized polyolefins and/or polyolefins are disclosed in U.S. Publication Nos. 2005/0043455 and 2003/0114322; U.S. Pat. No. 5,824,718 (see also related U.S. Pat. Nos. 5,741,852; 6,048,935; 4,806,594); 5,994,474; 6,043,401; 5,498,809; 5,266,627; 6,395,791 (see also 6,583, 222; and 6,585,188); 6,172,015; International Application Nos. WO03/040201 and WO90/01503; and European Patent 0944670B1.

There remains a need for low viscosity, low density, functionalized polyolefins that can be used in solvent-free, low viscosity adhesive formulations. There is a further need for improved adhesives for the following applications: case and carton sealing, automotive, graphic arts, nonwovens, panel assembly, high performance tapes, contact hot melt adhesives, paperboard coatings, inks, personal care and cosmetic products, sealants, color and additive concentrates, carpet-tape adhesives, and woodworking applications.

Currently, some of the high performance pressure sensitive adhesives (PSA) based on high molecular weight (MW) styrene block copolymers (SBCs) can only be produced using solvents. They can not be applied from a hot melt, due to their high viscosity (high molecular weight). The trend is to use solvent-free adhesives for both environmental and cost reasons. Also, reactive hot melts, based on urethane chemistry are expensive, and have safety issues, since they utilize isocyanate chemistry. Thus, there is a need for solvent-free compositions that are safe and cost-effective to produce, and that can be used as adhesives and in other applications (for example, applications that require compositions with improved paintability, toughness, compatibilization, impact resistance and/or flexibility).

At least some of these issues and others have been satisfied by the following invention.

SUMMARY OF THE INVENTION

The invention pertains to composition comprising at least one functionalized ethylene interpolymer, and wherein the at least one functionalized ethylene interpolymer is formed from an ethylene interpolymer, and at least one unsaturated compound containing at least one heteroatom, and wherein the ethylene interpolymer has a melt viscosity less than 50,000 cP at 350° F. (177° C.), and a molecular weight distribution $(M_w/M_n)$ from about 1 to 5.

The invention also provides a composition comprising a reaction product, said reaction product resulting from combining at least one ethylene interpolymer, at least one carbonyl-containing compound, and at least one initiator, and wherein the at least one ethylene interpolymer has a melt viscosity less than 50,000 cP at 350° F. (177° C.) and has a molecular weight distribution ($M_w/M_n$) from about 1 to 5.

The invention also provides a process for preparing a functionalized ethylene interpolymer, said process comprising, reacting an ethylene interpolymer, having a molecular weight distribution from about 1 to 5, with at least one carbonyl-containing compound and at least one initiator, and wherein the weight ratio of the "at least one carbonyl-containing compound" to the "at least one initiator" is from 10:1 to 500:1.

The invention also provides a composition comprising at least one functionalized propylene interpolymer, and where the at least one functionalized propylene interpolymer is formed from a propylene interpolymer and at least one unsaturated compound, containing at least one heteroatom, and where the propylene interpolymer has a melt viscosity less than 70,000 cP (190° C.) and a molecular weight distribution ($M_w/M_n$) from about 1 to 5.

The invention also provides a composition comprising at least one functionalized ethylene interpolymer and at least one functionalized propylene interpolymer, and where the at least one functionalized ethylene interpolymer has a melt viscosity less than 50,000 cP at 350° F. (177° C.).

BRIEF DESCRIPTION OF THE DRAWINGS

FIG. 1 depicts two Fourier Transform Infrared (FTIR) profiles for a polyethylene grafted with maleic anhydride.

DETAILED DESCRIPTION OF THE INVENTION

The invention provides functionalized interpolymers, as described herein, and provides for compositions comprising the same. The interpolymers, as described herein, may be functionalized to introduce functionality for enhanced compatibility with other polymer systems, to introduce functionality for further reactivity with other polymers and other agents, and/or to introduce functionality to enhance adhesion properties and/or interfacial activity.

The introduction of certain functionalities may change the interfacial characteristics of the base polymers, and this will typically lead to enhanced interfacial activity, which is often manifested in improved properties, such as paintability, toughening, compatibilization, adhesion and adhesion in tie layers.

In addition, the inventive functionalized interpolymers may be blended with one or more polymers to develop resins with one or more improvements in the following properties: viscosity, heat resistance, impact resistance, toughness, flexibility, tensile strength, compression set, stress relaxation, creep resistance, tear strength, blocking resistance, solidification temperature, abrasion resistance, retractive force, oil retention, pigment retention and filler capacity. The inventive functionalized interpolymers may be blended into thermoset systems such as epoxies, unsaturated polyesters, and the like, prior to curing, or during curing, to improve the performance of the cured thermoset in properties, such as, for example, impact resistance, toughness and flexibility.

As discussed above, the invention provides a composition, comprising at least one functionalized ethylene interpolymer, and wherein the functionalized ethylene interpolymer is formed from at least one unsaturated compound containing at least one heteroatom, and where the ethylene interpolymer that has a melt viscosity less than 50,000 cP, preferably less than 40,000 cP, and more preferably less than 30,000 cP at 350° F. (177° C.), and a molecular weight distribution ($M_w/M_n$) from about 1 to 5, or 1.1 to 5, preferably from about 1 to 4, and preferably from about 1 to 3.5, and more preferably from about 1 to 3.5, or 1.1 to 3.5. All individual values and subranges from about 1 to 5 are included herein and disclosed herein. Preferably the ethylene interpolymer is an ethylene/α-olefin interpolymer.

In a preferred embodiment, the at least one unsaturated compound is a carbonyl-containing compound. In a further aspect, the carbonyl-containing compound is selected from the group consisting of maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof. In a further embodiment, the unsaturated compound is an anhydride, and preferably maleic anhydride.

In another embodiment of the invention, the ethylene interpolymer contains a ratio (Rv) of terminal vinyl groups to the sum of all unsaturation from 0.001 to 0.5, preferably from 0.01 to 0.4, and more preferably from 0.1 to 0.3, as determined by $^1$H NMR. All individual values and subranges from 0.001 to 0.5 are included herein and disclosed herein. Preferably the ethylene interpolymer is an ethylene/α-olefin interpolymer.

In another embodiment of the invention, the ethylene interpolymer has a number average molecular weight ($M_n$) less than 30,000, and preferably less than 20,000. Preferably the ethylene interpolymer is an ethylene/α-olefin interpolymer.

In another embodiment of the invention, the ethylene interpolymer, has a percent crystallinity less than 30 percent, and preferably less than 25 percent. Preferably the ethylene interpolymer is an ethylene/α-olefin interpolymer.

In another embodiment of the invention, the ethylene interpolymer, has at least one melting temperature from 50° C. to 90° C., and preferably from 60° C. to 80° C. Preferably the ethylene interpolymer is an ethylene/α-olefin interpolymer.

In another embodiment of the invention, the ethylene interpolymer lacks long chain branching. Yet in another aspect of the invention, the ethylene interpolymer has long chain branching. Preferably the ethylene interpolymer is an ethylene/α-olefin interpolymer.

In another embodiment, the at least one functionalized ethylene interpolymer has a number average molecular weight from 4,000 to 30,000 g/mole, preferably from 7,000 to 20,000 g/mole, more preferably from 10,000 to 20,000 g/mole. All individual values and subranges from 4,000 to 30,000 g/mole, are included herein and disclosed herein. Preferably the functionalized ethylene interpolymer is a functionalized ethylene/α-olefin interpolymer. In yet another embodiment, the at least one functionalized ethylene interpolymer has a weight average molecular weight from 8,000 to 60,000 g/mole, preferably from 14,000 to 40,000 g/mole, more preferably from 10,000 to 30,000 g/mole. All individual values and subranges from 8,000 to 60,000 g/mole, are included herein and disclosed herein. All individual values and subranges from 2,000 to 50,000 cP, are included herein and disclosed herein. Preferably the functionalized ethylene interpolymer is a functionalized ethylene/α-olefin interpolymer.

In another embodiment, the at least one functionalized ethylene interpolymer has a density from 0.855 g/cm$^3$ to 0.93 g/cm$^3$, preferably from 0.86 g/cm$^3$ to 0.92 g/cm$^3$, and more preferably from 0.86 g/cm$^3$ to 0.90 g/cm$^3$. All individual values and subranges from 0.855 g/cm$^3$ to 0.93 g/cm$^3$ are included herein and disclosed herein. Preferably the functionalized ethylene interpolymer is a functionalized ethylene/α-olefin interpolymer.

In another embodiment, the at least one functionalized ethylene interpolymer has a number average molecular weight from 4,000 to 30,000 g/mole, preferably from 7,000 to 20,000 g/mole, more preferably from 10,000 to 20,000 g/mole. All individual values and subranges from 4,000 to 30,000 g/mole, are included herein and disclosed herein. Preferably the functionalized ethylene interpolymer is a functionalized ethylene/α-olefin interpolymer. In yet another embodiment, the at least one functionalized ethylene interpolymer has a weight average molecular weight from 8,000 to 60,000 g/mole, preferably from 14,000 to 40,000 g/mole, more preferably from 10,000 to 30,000 g/mole. All individual values and subranges from 8,000 to 60,000 g/mole, are included herein and disclosed herein. All individual values and subranges from 2,000 to 50,000 cP, are included herein and disclosed herein. Preferably the functionalized ethylene interpolymer is a functionalized ethylene/α-olefin interpolymer. In a further embodiment, the at least one functionalized ethylene interpolymer has a melt viscosity at 350° F. (177° C.) from 2,000 to 50,000 cP, preferably from 4,000 to 30,000 cP, more preferably from 5,000 to 25,000 cP, and even more preferably from 6,000 to 20,000 cP. Preferably the functionalized ethylene interpolymer is a functionalized ethylene/α-olefin interpolymer.

In another embodiment, the functionalized ethylene interpolymer has a melt viscosity at 350° F. (177° C.) less than 50,000 cP, preferably less than 40,000 cP, more preferably less than 30,000 cP, and even more preferably less than 20,000 cP. In another embodiment, the functionalized ethylene interpolymer has a melt viscosity at 350° F. (177° C.) greater than 2,000 cP, preferably greater than 3,000 cP, more preferably greater than 4,000 cP. Preferably the functionalized ethylene interpolymer is a functionalized ethylene/α-olefin interpolymer.

In another embodiment, the ethylene interpolymer, and preferably an ethyelene/α-olefin interpolymer, has a melt viscosity at 350° F. (177° C.) less than 20,000 cP, and the functionalized ethylene interpolymer, preferably a functionalized ethylene/α-olefin interpolymer, has a melt viscosity at 350° F. (177° C.) less than 25,000 cP. In a further embodiment, both the ethylene interpolymer, preferably an ethylene/α-olefin interpolymer, and the functionalized ethylene interpolymer, preferably a functionalized ethylene/α-olefin interpolymer, each has, independently, a melt viscosity at 350° F. (177° C.) greater than 2,000 cP, preferably greater than 3,000 cP, more preferably greater than 4,000 cP.

In another embodiment, the ethylene interpolymer, and preferably an ethyelene/α-olefin interpolymer, has a melt viscosity at 350° F. (177° C.) less than 15,000 cP, and the functionalized ethylene interpolymer, preferably a functionalized ethylene/α-olefin interpolymer, has a melt viscosity at 350° F. (177° C.) less than 20,000 cP. In a further embodiment, both the ethylene interpolymer, preferably an ethylene/α-olefin interpolymer, and the functionalized ethylene interpolymer, preferably a functionalized ethylene/α-olefin interpolymer, each has, independently, a melt viscosity at 350° F. (177° C.) greater than 2,000 cP, preferably greater than 3,000 cP, more preferably greater than 4,000 cP.

In another embodiment, the ethylene interpolymer is formed from ethylene and at least one comonomer, selected from the group consisting of ethylenically unsaturated monomers, conjugated dienes, nonconjugated dienes, and polyenes. In a further aspect, the comonomer is an ethylenically unsaturated monomer, selected from the group consisting of the $C_3$-$C_{20}$ α-olefins, styrene, alkyl-substituted styrene, vinylbenzocyclobutane, and 1,4-hexadiene. In a further aspect, the $C_3$-$C_{20}$ α-olefin is selected from the group consisting of 1-propene, isobutylene, 1-butene, 1-pentene, 1-hexene, 1-heptene, 4-methyl-1-pentene, and 1-octene. In yet a further aspect, the $C_3$-$C_{20}$ α-olefin is selected from the group consisting of propylene, 1-butene, 1-hexene and 1-octene, and more preferably from propylene and 1-octene.

In another embodiment, the at least one functionalized ethylene interpolymer is prepared by reacting the ethylene interpolymer with at least one carbonyl-containing compound and at least one initiator, and wherein, the weight ratio of the "at least one carbonyl-containing compound" to the "at least one initiator" is from 10:1 to 500:1, preferably from 20:1 to 400:1, and more preferably from 30:1 to 300:1. In a further embodiment, the reaction takes place in an extruder. All individual values and subranges from 10:1 to 500:1 are included herein and disclosed herein. In yet a further embodiment, the at least one initiator is selected from the group consisting of organic peroxides. In another embodiment, the ethylene interpolymer has a molecular weight distribution from about 1 to 3. Preferably the ethylene interpolymer is an ethylene/α-olefin interpolymer.

In a further embodiment, the at least one carbonyl-containing compound, is present in an amount of at least 0.25 weight percent, preferably at least 0.5 weight percent, and even more preferably at least 1 weight percent, based on the total weight of the reactive composition. In another aspect, the initiator is present in an amount from 250 ppm to 2500 ppm, preferably from 500 ppm to 2200 ppm, and more preferably from 1000 ppm to 2000 ppm, based on the total weight of the reactive composition. In yet another embodiment, the at least one carbonyl-containing compound is grafted onto the ethylene interpolymer, and the amount of the at least one carbonyl-containing compound that is grafted, is greater than 0.25 weight percent, preferably greater than 0.5 weight percent, based on the total weight of the reactive composition. In a further embodiment, the amount of the at least one carbonyl-containing compound that is grafted, is greater than 1 weight percent, based on the total weight of the reactive composition.

In yet another embodiment, the at least one carbonyl-containing compound, is present in an amount of at least 0.25 weight percent, preferably at least 0.50 weight percent, more preferably at least 1.0 weight percent, and even more preferably at least 1.5 weight percent, based on the total weight of the reactive composition; and the initiator is present in an amount from 250 ppm to 2500 ppm, preferably from 500 ppm to 2200 ppm, and more preferably from 1000 ppm to 2000 ppm, based on the total weight of the reactive composition. All individual values and subranges from 250 ppm to 2500 ppm are included herein and disclosed herein. In yet another embodiment, the at least one carbonyl-containing compound is grafted onto the ethylene interpolymer, and wherein the amount of the at least one carbonyl-containing compound that is grafted, is greater than 0.25 weight percent, preferably greater than 0.50 weight percent, based on the total weight of the reactive composition. In a further embodiment, the amount of the at least one carbonyl-containing compound that is grafted, is greater than 2 weight percent, based on the total weight of the reactive composition.

In another embodiment, an inventive composition further comprises at least one tackifier. In another embodiment, the composition further comprises at least one wax. In yet another embodiment, the composition further comprises at least one oil. In another embodiment, the at least one functionalized ethylene interpolymer is present in an amount from 15 to 50 weight percent, preferably from 20 to 45 weight percent, based on the total weight of the composition, and wherein the composition further comprises from 0 to 40 weight percent, preferably from 5 to 35 weight percent, of at least one tackifier, based on the total weight of the composition, and from 0 to 40 weight percent, preferably from 5 to 35 weight percent, of at least one oil, based on the total weight of the composition. In another embodiment, the at least one functionalized ethylene interpolymer is present in an amount from 15 to 50 weight percent, preferably from 20 to 45 weight percent, based on the total weight of the composition, and wherein the composition further comprises from 0 to 40 weight percent, preferably from 5 to 35 weight percent, of at least one tackifier, based on the total weight of the composition, and from 0 to 40 weight percent, preferably from 5 to 35 weight percent, of at least one wax, based on the total weight of the composition.

The invention also provides a composition comprising a reaction product, said reaction product resulting from combining at least one ethylene interpolymer, at least one carbonyl-containing compound, and at least one initiator, and wherein the at least one ethylene interpolymer has a melt viscosity less than 50,000 cP, preferably less than 40,000 cP, and more preferably less than 30,000 cP, at 350° F. (177° C.), and has a molecular weight distribution ($M_w/M_n$) from about 1 to 5, or 1.1 to 5, preferably from about 1 to 4, and more preferably from about 1 to 3. In another aspect, the molecular weight distribution is from about 1 to 3.5, or 1.1 to 3.5. Preferably the ethylene interpolymer is an ethylene/α-olefin interpolymer.

In another aspect, an inventive composition further comprises one or more polyolefins, selected from the group consisting of polyethylene homopolymers, ethylene/α-olefin interpolymers, polypropylene homopolymers and propylene/α-olefin interpolymers.

The invention also provides for a composition comprising at least one functionalized propylene interpolymer, and wherein the at least one functionalized propylene interpolymer is formed from a propylene interpolymer and at least one unsaturated compound containing at least one heteroatom, and wherein the propylene interpolymer has a melt viscosity less than 70,000 cP, preferably less than 40,000 cP, and more preferably less than 30,000 cP at 374° F. (190° C.), and a molecular weight distribution ($M_w/M_n$) from about 1 to 5, or 1.1 to 5, preferably from about 1 to 4, and more preferably from about 1 to 3. In another aspect, the propylene interpolymer has a molecular weight distribution from about 1 to 3.5, or 1.1 to 3.5. Preferably the propylene interpolymer is an propylene/α-olefin interpolymer or a propylene/ethylene interpolymer.

The invention also provides a composition comprising at least one functionalized ethylene interpolymer and at least one functionalized propylene interpolymer, and wherein the at least one functionalized ethylene interpolymer has a melt viscosity less than 50,000 cP, preferably less than 40,000 cP, and more preferably less than 30,000 cP at 350° F. (177° C.). In a further aspect, the at least one functionalized ethylene interpolymer is formed from an ethylene interpolymer that has a molecular weight distribution ($M_w/M_n$) from about 1 to 5, or 1.1 to 5, preferably from about 1 to 4, and more preferably from about 1 to 3. In another aspect, the molecular weight distribution is from about 1 to 3.5, or 1.1 to 3.5. In a further embodiment, at least one functionalized ethylene interpolymer is formed from an ethylene interpolymer containing a ratio (Rv) of terminal vinyl groups to the sum of all unsaturation from 0.001 to 0.5, preferably from 0.01 to 0.40, and more preferably from 0.10 to 0.30, as determined by $^1$H NMR. In another embodiment, the composition further comprising at least one tackifier. In another embodiment, the composition further comprising at least one oil. In another embodiment, the composition further comprising at least one wax. In another embodiment, the at least one functionalized ethylene interpolymer is present in an amount from 15 to 50 weight percent, preferably from 20 to 45 weight percent, based on the total weight of the composition, and the composition further comprises from 0 to 40 weight percent, preferably from 5 to 35 weight percent, of at least one tackifier, based on the total weight of the composition, and from 0 to 40 weight percent, preferably from 5 to 35 weight percent, of at least one oil, based on the total weight of the composition. In yet another embodiment, the at least one functionalized ethylene interpolymer is present in an amount from 15 to 50 weight percent, preferably from 20 to 45 weight percent, based on the total weight of the composition, and the composition further comprises from 0 to 40 weight percent, preferably from 5 to 35 weight percent, of at least one tackifier, based on the total weight of the composition, and from 0 to 40 weight percent, preferably from 5 to 35 weight percent, of at least one wax, based on the total weight of the composition. Preferably the ethylene interpolymer is an ethylene/α-olefin interpolymer.

An inventive composition may comprise one or more embodiments as described herein.

The invention also provides for articles, comprising at least one component formed from an inventive composition. In a further embodiment, the article is an adhesive; or an article comprising wood, such as a piece of furniture, a cabinet, a wooden flooring, or a laminated flooring. An inventive article may comprise one or more embodiments as described herein.

The invention also provides a process for preparing a functionalized ethylene interpolymer, said process comprising, reacting an ethylene interpolymer, having a molecular weight distribution from about 1 to 5, or 1.1 to 5, preferably from about 1 to 4, and more preferably from about 1 to 3, with at least one carbonyl-containing compound and at least one initiator, and wherein the weight ratio of the "at least one carbonyl-containing compound" to the "at least one initiator" is from 10:1 to 500:1, preferably from 20:1 to 400:1, and more preferably from 30:1 to 300:1. In another embodiment, the ethylene interpolymer has a molecular weight distribution from about 1 to 3.5, or 1.1 to 3.5. In yet a further embodiment of this process, the ethylene interpolymer has a melt viscosity less than 50,000 cP, preferably less than 40,000 cP, and more preferably less than 30,000 cP at 350° F. (177° C.). In another embodiment, the ethylene interpolymer contains a ratio (Rv) of terminal vinyl groups to the sum of all unsaturation from 0.001 to 0.5, preferably from 0.01 to 0.4, and more preferably from 0.10 to 0.3, as determined by $^1$H NMR. In another embodiment, the at least one initiator is selected from the group consisting of organic peroxides.

An inventive process may comprise one or more embodiments as described herein.

Ethylene Interpolymers

In one embodiment, the polyolefins used in preparation of the functionalized interpolymers are interpolymers of ethylene and at least one suitable comonomer. In a preferred embodiment, the ethylene interpolymer is functionalized with at least one unsaturated compound containing at least one heteroatom. In yet another embodiment, the at least one unsaturated compound, containing at least one heteroatom, is a carbonyl-containing compound, and more preferably maleic anhydride. Preferably the ethylene interpolymer is an ethylene/α-olefin interpolymer.

The ethylene interpolymers used in preparation of the functionalized interpolymers of the invention have a molecular weight distribution ($M_w/M_n$) less than, or equal to, 5, and preferably less than, or equal to, 4. In another embodiment, the ethylene interpolymer has a molecular weight distribution ($M_w/M_n$) greater than, or equal to, 1.1, preferably less than, or equal to, 1.3, and more preferably less than, or equal to, 1.5. More preferably the ethylene/α-olefin interpolymers have a molecular weight distribution from about 1 to 5, or 1.1 to 5, preferably from about 1 to 4, and more preferably from about 1 to 3.5 or about 1 to 3. All individual values and subranges from 1 to 5 are included herein and disclosed herein. Preferably the ethylene interpolymer is an ethylene/α-olefin interpolymer.

In another embodiment, the ethylene interpolymer has a molecular weight distribution ($M_w/M_n$) less than, or equal to, 3.5, preferably less than, or equal to, 3.0, and more preferably less than, or equal to, 2.5. In another embodiment, the ethylene interpolymer has a molecular weight distribution ($M_w/M_n$) greater than, or equal to, 1.1, preferably less than, or equal to, 1.5, and more preferably less than, or equal to, 2.0. Preferably the ethylene interpolymer is an ethylene/α-olefin interpolymer.

Preferred comonomers include, but are not limited to, propylene, isobutylene, 1-butene, 1-pentene, 1-hexene, 3-methyl-1-pentene, 4-methyl-1-pentene, 1-heptene and 1-octene, non-conjugated dienes, polyenes, butadienes, isoprenes, pentadienes, hexadienes (e.g., 1,4-hexadiene), octadienes, decadienes (for example, 1,9-decadiene), styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one C3-C20 α-olefin, and more preferably a C3-C10 α-olefin. Preferred α-olefins include propylene, 1-butene, 1-hexene and 1-octene, and more preferably propylene and 1-octene.

In one embodiment, the ethylene interpolymer does not contain an aromatic comonomer polymerized therein. In a further embodiment, the ethylene interpolymer does not contain a vinyl aromatic comonomer polymerized therein. In yet a further embodiment, the ethylene interpolymer does not contain styrene, p-methyl styrene or divinyl styrene polymerized therein. Preferably the ethylene interpolymer is an ethylene/α-olefin interpolymer.

In another embodiment, the ethylene interpolymers, used in preparation of the functionalized interpolymers, have a melt viscosity from 2,000 cP to 50,000 cP. All individual values and subranges from 2,000 cP to 50,000 cP are included and disclosed herein. Melt viscosity is measured using a Brookfield viscometer at 350° F. (177° C.). Preferably, the melt viscosity is from 4,000 cP to 30,000 cP, and more preferably from 6,000 cP to 20,000 cP. Preferably the ethylene interpolymer is an ethylene/α-olefin interpolymer.

In another embodiment, the ethylene interpolymer, used in preparation of the functionalized interpolymers, has a melt viscosity less than, or equal to, 25,000 cP, preferably less than, or equal to, 20,000 cP, and more preferably less than, or equal to, 15,000 cP. In another embodiment, the ethylene interpolymer, used in preparation of the functionalized interpolymers, has a melt viscosity greater than, or equal to, 2,000 cP, preferably greater than, or equal to, 3,000 cP, and more preferably greater than, or equal to, 4,000 cP. Melt viscosity is measured using a Brookfield viscometer at 350° F. (177° C.). Preferably the ethylene interpolymer is an ethylene/α-olefin interpolymer.

In another embodiment, the ethylene interpolymers, used in preparation of the functionalized interpolymers, have a melt index (I2) from 200 g/10 min to 3,500 g/10 min, preferably from 300 g/10 min to 2,000 g/10 min, and more preferably from 400 g/10 min to 1,500 g/10 min, as determined using ASTM D-1238 (190° C., 2.16 kg load). All individual values and subranges from 200 g/10 min to 3,500 g/10 min are includes herein and disclosed herein. Melt index may be calculated from the following equation (see U.S. Pat. No. 6,335,410): $I_2$ (190° C./2.16 kg)=3.6126 $[10^{(\log(\eta)-6.6928)/-1.1363}]$−9.3185, where η=melt viscosity, in cP, at 350° F. Preferably the ethylene interpolymer is an ethylene/α-olefin interpolymer.

In another embodiment, the ethylene interpolymers, used in preparation of the functionalized interpolymers, have a melt index (I2) greater than 200 g/10 min, preferably greater than 300 g/10 min, and more preferably greater than 400 g/10 min, as determined using ASTM D-1238 (190° C., 2.16 kg load). In another embodiment, the ethylene interpolymers, used in preparation of the functionalized interpolymers, have a melt index (I2) less than 3500 g/10 min, preferably less than 3000 g/10 min, and more preferably less than 2500 g/10 min, as determined using ASTM D-1238 (190° C., 2.16 kg load) Melt index may be calculated from the following equation (see U.S. Pat. No. 6,335,410): $I_2$ (190° C./2.16 kg)=3.6126 $[10^{(\log(\eta)-6.6928)/-1.1363}]$−9.3185, where η=melt viscosity, in cP, at 350° F. Preferably the ethylene interpolymer is an ethylene/α-olefin interpolymer.

In another embodiment, the ethylene interpolymers, used in preparation of the functionalized interpolymers of the invention, have a number average molecular weight from 4,000 to 30,000, preferably from 5,000 to 25,000, more preferably from 5,000 to 15,000, and even more preferably from 6,000 to 14,000. All individual values and subranges from 4,000 to 30,000 are included herein and disclosed herein. All molecular weights, as disclosed herein, have the unit "g/mole." Preferably the ethylene interpolymer is an ethylene/α-olefin interpolymer.

In another embodiment, the ethylene interpolymers, used in preparation of the functionalized interpolymers of the invention, have a weight average molecular weight from 8,000 to 60,000, preferably from 10,000 to 50,000, and more preferably from 12,000 to 30,000. All individual values and subranges are included in the range 8,000 to 60,000, and disclosed herein. Preferably the ethylene interpolymer is an ethylene/α-olefin interpolymer.

In another embodiment, the ethylene interpolymers, used in preparation of the functionalized interpolymers of the invention, have a weight average molecular weight less than 40,000, preferably less than 30,000, and more preferably less than 25,000 g/mole. Preferably the ethylene interpolymer is an ethylene/α-olefin interpolymer.

In another embodiment, the ethylene interpolymers, used in preparation of the functionalized interpolymers of the invention, have a weight average molecular weight greater than 8,000, preferably greater than 9,000, and more preferably greater than 10,000 g/mole. Preferably the ethylene interpolymer is an ethylene/α-olefin interpolymer.

In another embodiment, the ethylene interpolymers, used in preparation of the functionalized interpolymers of the invention, have a percent crystallinity of less than, or equal to, 50 percent, preferably less than, or equal to, 40 percent, and more preferably less than, or equal to, 25 percent, as measured by DSC. In another embodiment, the ethylene interpolymers, have a percent crystallinity of greater than, or equal to, 2 percent, preferably greater than, or equal to, 5 percent, as measured by DSC. Preferably, these interpolymers have a percent crystallinity from 2 percent to 50 percent, including all individual values and subranges from 2 percent to 50 percent. Such individual values and subranges are included herein and disclosed herein. Preferably the ethylene interpolymer is an ethylene/α-olefin interpolymer.

In another embodiment, the ethylene interpolymers, used in preparation of the functionalized interpolymers of the invention, have a comonomer incorporation in the final polymer greater than 2 mole percent, preferably greater than 3 mole percent, based on the total moles of polymerizable monomers (monomer plus comonomer(s)). The amount of comonomer incorporation can be greater than 6 mole percent, and can even be greater than 10 mole percent, based on the total moles of polymerizable monomers. Preferably the ethylene interpolymer is an ethylene/α-olefin interpolymer.

In another embodiment, the ethylene interpolymers, used in preparation of the functionalized interpolymers of the invention, have a density from 0.855 g/cm$^3$ to 0.93 g/cm$^3$, and preferably from 0.86 g/cm$^3$ to 0.90 g/cm$^3$, and more preferably from 0.865 g/cm$^3$ to 0.895 g/cm$^3$. All individual values and subranges from 0.855 g/cm$^3$ to 0.93 g/cm$^3$ are included herein and disclosed herein. Preferably the ethylene interpolymer is an ethylene/α-olefin interpolymer.

In another embodiment, the ethylene interpolymer, used in preparation of the functionalized interpolymers of the invention, has a density less than 0.900 g/cm$^3$, preferably less than 0.890 g/cm$^3$, and more preferably less than 0.880 g/cm$^3$. In another embodiment, the ethylene interpolymer, used in preparation of the functionalized interpolymers of the invention, has a density greater than 0.850 g/cm$^3$, preferably greater than 0.855 g/cm$^3$, and more preferably greater than 0.860 g/cm$^3$. Preferably the ethylene interpolymer is an ethylene/α-olefin interpolymer.

Examples of ethylene interpolymers suitable for the invention include the AFFINITY™ and ENGAGE™ interpolymers, available from The Dow Chemical Company. Other examples of ethylene/α-olefin interpolymers suitable for the invention include the low molecular weight ethylene interpolymers described in U.S. Pat. Nos. 6,335,410, 6,054,544 and 6,723,810. The entire contents of each of these patents are incorporated herein by reference. Other suitable interpolymers include ethylene-α-olefin block copolymers and interpolymers, and other ethylene based block copolymers and interpolymers known in the art.

The ethylene interpolymers used in preparation of the functionalized interpolymers may be "homogeneous" or "homogeneously branched" interpolymers prepared using the constrained geometry catalysts, as disclosed in U.S. Pat. Nos. 5,272,236; 5,278,272; 5,064,802; 5,132,380; 5,703,187; 6,034,021; 5,321,106 (EP 0 468 651); 6,118,013 (EP 0 514 828); and WO 93/19104 (U.S. Pat. Nos. 5,374,696; 5,532, 394; 5,723,398); and WO 95/00526 (U.S. Pat. Nos. 5,470, 993; 5,556,928; 5,624,878). All of these patents and publications are incorporated by references, herein, in their entirety. Another suitable class of catalysts, used to prepare such interpolymers, is the metallocene catalysts, disclosed in U.S. Pat. Nos. 5,044,438; 5,057,475; 5,096,867; and 5,324,800, all of which are incorporated by reference, herein, in their entirety. The constrained geometry catalysts and the metallocene catalysts are both sometimes referred to as "single-site catalysts."

In one embodiment, the ethylene interpolymer is a homogeneously branched linear interpolymer or a homogeneously branched substantially linear interpolymer. In another embodiment, the ethylene interpolymer is a homogeneously branched substantially linear interpolymer. In a further embodiment, the ethylene interpolymer is a homogeneously branched substantially linear interpolymer with an I10/I2 ratio from 7 to 10, and preferably from 8 to 10. Preferably the ethylene interpolymer is an ethylene/α-olefin interpolymer.

In another embodiment, the ethylene interpolymer is prepared using a single-site catalyst. In a further embodiment, the ethylene interpolymer is prepared using a constrained geometry catalyst. Preferably the ethylene interpolymer is an ethylene/α-olefin interpolymer.

In another embodiment, the ethylene interpolymer contains greater than 55 mole percent ethylene, and preferably greater than 60 mole percent ethylene, based on the total moles of polymerizable monomers. Preferably the ethylene interpolymer is an ethylene/α-olefin interpolymer.

The ethylene interpolymers, used in preparation of the functionalized interpolymers, may be polymerized in two reactors, with a first polymer being polymerized in a first reactor, and a second polymer (of higher or lower molecular weight, and/or of different density, and/or, which is heterogeneous) being polymerized in a second reactor, which is connected in series, or in parallel, to the reactor in which the first polymer is produced. Such a dual polymerization is used to prepare in-reactor polymer blends having desirable properties. An example of this is disclosed in WO 94/00500, incorporated herein. Additionally, dual catalysts may be used in polymerizations in one or more reactors as discussed in WO2005/028584A1, incorporated herein by reference.

An ethylene interpolymer may comprise a combination of two or more suitable embodiments as described herein.

An ethylene/α-olefin interpolymer may comprise a combination of two or more suitable embodiments as described herein.

Propylene Interpolymers

In another embodiment, functionalization reactions can be used to functionalize other olefin based interpolymers, in addition to ethylene interpolymers. For example, the maleation, as described herein, of propylene interpolymers, containing at least 50 mole percent polymerized propylene (based on the total moles of polymerizable monomers), fall within the invention. Suitable polypropylene base interpolymers include VERSIFY™ interpolymers (The Dow Chemical Company) and VISTAMAXX™ interpolymers (ExxonMobil Chemical Co.), LICOCENE™ interpolymers (Clariant), EASTOFLEX™ interpolymers (Eastman Chemical Co.), REXTAC™ interpolymers (Hunstman), and VESTOPLAST™ interpolymers (Degussa). Other suitable interpolymers include propylene-α-olefins block copolymers and interpolymers, and other propylene based block copolymers and interpolymers known in the art. Other suitable propylene polymers are described in International Publication No. WO 2006/069205, incorporated herein in its entirety by reference.

The propylene interpolymers, used in preparation of the functionalized interpolymers, of the invention have a molecular weight distribution less than, or equal to, 5, and preferably less than, or equal to, 4. Preferably the propylene interpolymers have a molecular weight distribution from about 1 to 5, more preferably from about 1 to 4, and even more preferably from about 1 to 3.5 or about 1 to 3. In another embodiment, the propylene interpolymers have a molecular weight distribution greater than, or equal to, 1.1, and preferably greater than, or equal to, 1.5. All individual values and subranges from about 1 to 5 are included herein and disclosed herein. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

The propylene/α-olefin interpolymers, used in preparation of the functionalized interpolymers, are interpolymers of propylene and at least one suitable comonomer. Preferred comonomers include, but are not limited to, ethylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (e.g., 1,4-hexadiene), octadienes, decadienes (eg. 1,9-decadiene), styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is ethylene or a C4-C20 α-olefin, more preferably ethylene or a C4-C10 α-olefin, and even more preferably ethylene.

In one embodiment, the propylene interpolymer does not contain an aromatic comonomer polymerized therein. In a further embodiment, the propylene interpolymer does not contain a vinyl aromatic comonomer polymerized therein. In yet a further embodiment, the propylene interpolymer does not contain styrene, p-methyl styrene or divinyl styrene polymerized therein. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

In another embodiment, the propylene/α-olefin interpolymers, used in preparation of the functionalized interpolymers of the invention, have a percent crystallinity of less than, or equal to, 60 percent, preferably less than, or equal to, 40 percent, and more preferably less than, or equal to, 35 percent, as measured by DSC. In another embodiment, the propylene/α-olefin interpolymers have a percent crystallinity of greater than, or equal to, 2 percent, preferably greater than, or equal to, 2 percent, as measured by DSC. Preferably, these interpolymers have a percent crystallinity from 2 percent to 60 percent, including all individual values and subranges from 2 percent to 60 percent. Such individual values and subranges are included herein and disclosed herein. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

In another embodiment, the propylene interpolymers, used in preparation of the functionalized interpolymers, have a comonomer incorporation in the final polymer greater than 2 mole percent, preferably greater than 3 mole percent, based on the total moles of polymerizable monomers. The amount of comonomer incorporation can be greater than 6 mole percent, and can even be greater than 10 mole percent, based on the total moles of polymerizable monomers. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

In another embodiment, the propylene interpolymers used in preparation of the functionalized interpolymers, have a density from 0.855 g/cm$^3$ to 0.895 g/cm$^3$, and preferably from 0.86 g/cm$^3$ to 0.89 g/cm$^3$, and more preferably from 0.86 g/cm$^3$ to 0.88 g/cm$^3$. All individual values and subranges from 0.855 g/cm$^3$ to 0.895 g/cm$^3$, are included herein and disclosed herein. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

In another embodiment, the propylene interpolymers used in preparation of the functionalized interpolymers, have a density less than, or equal to, 0.895 g/cm$^3$, preferably less than, or equal to, 0.89 g/cm$^3$, and more preferably less than, or equal to, 0.88 g/cm$^3$. In another embodiment, the propylene interpolymers used in preparation of the functionalized interpolymers, have a density greater than, or equal to, 0.855 g/cm$^3$, preferably greater than, or equal to, 0.86 g/cm$^3$, and more preferably greater than, or equal to, 0.865 g/cm$^3$. Preferably the propylene interpolymer is a propylene/α-olefin interpolymer or propylene/ethylene interpolymer. In one embodiment, the propylene interpolymer is a propylene/α-olefin interpolymer. In another embodiment, the propylene interpolymer is a propylene/ethylene interpolymer.

In another embodiment, the propylene/α-olefin interpolymers or propylene/ethylene interpolymers, used in preparation of the functionalized interpolymers, have a melt viscosity less than 70,000 cP, and preferably from 250 cP to 70,000 cP. All individual values and subranges from 250 cP to 70,000 cP are included herein and disclosed herein. Melt viscosity is measured using a Brookfield viscometer at 374° F. (190° C.). Preferably, the melt viscosity is from 400 cP to 40,000 cP, and more preferably from 500 cP to 30,000 cP. Preferably the propylene interpolymer is a propylene/α-olefin interpolymer or propylene/ethylene interpolymer.

In another embodiment, the propylene interpolymers used in preparation of the functionalized interpolymers, have a melt viscosity less than, or equal to, 60,000 cP, and preferably less than, or equal to, 50,000 cP, and more preferably less than, or equal to, 40,000 cP. In another embodiment, the propylene interpolymers used in preparation of the functionalized interpolymers, have a melt viscosity greater than, or equal to, 250 cP, and preferably greater than, or equal to, 500 cP, and more preferably greater than, or equal to, 1,000 cP. Melt viscosity is measured using a Brookfield viscometer at 374° F. (190° C.). Preferably the propylene interpolymer is a propylene/α-olefin interpolymer or propylene/ethylene interpolymer.

In another embodiment, the propylene interpolymers used in preparation of the functionalized interpolymers of the invention, have a number average molecular weight from 3,000 to 35,000, preferably from 5,000 to 30,000, and more preferably from 6,000 to 25,000. All individual values and subranges from 3,000 to 35,000 are included herein and disclosed herein. All molecular weights, as disclosed herein, have the unit "g/mole." Preferably the propylene interpolymer is a propylene/α-olefin interpolymer or propylene/ethylene interpolymer.

In another embodiment, the propylene interpolymers used in preparation of the functionalized interpolymers of the invention, have a weight average molecular weight from 6,000 to 105,000, preferably from 10,000 to 90,000, and more preferably from 12,000 to 60,000, and even more preferably from 12,000 to 30,000. All individual values and subranges from 6,000 to 105,000 are included and disclosed herein. Preferably the propylene interpolymer is a propylene/α-olefin interpolymer or propylene/ethylene interpolymer.

A propylene interpolymer may comprise a combination of two or more suitable embodiments as described herein.

A propylene/α-olefin interpolymer may comprise a combination of two or more suitable embodiments as described herein.

A propylene/ethylene interpolymer may comprise a combination of two or more suitable embodiments as described herein.

Functionalized Polyolefin Blends

In another embodiment of the invention, a blend of two of more polyolefins is subject to functionalization reactions as described herein.

The functionalizing agent can be reacted with the polymers of the polyolefin blend by blending the individual polymers with the agent and initiator in the first stage of a reactor extruder. The grafting reaction should be performed under conditions that maximize grafts onto the polymer backbone, and minimize side reactions.

In one embodiment, the resin blend contains an ethylene interpolymer and a propylene interpolymer. Suitable ethylene interpolymers and propylene interpolymers include, but are not limited to, those described herein.

Functionalization

The ethylene interpolymers disclosed herein may be modified by typical grafting, hydrogenation, nitrene insertion, epoxidation, or other functionalization reactions, well known to those skilled in the art. Preferred functionalizations are grafting reactions using a free radical mechanism.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate and vinyl chloride.

Mixtures of radically graftable species that comprise at least one of the above species may be used, with styrene/maleic anhydride and styrene/acrylonitrile as illustrative examples.

A thermal grafting process is one method for reaction; however, other grafting processes may be used, such as photo initiation, including different forms of radiation, e-beam, or redox radical generation.

The functionalized interpolymers disclosed herein may also be modified by various chain extending or cross-linking processes, including, but not limited to peroxide-, sulfur-, radiation-, or azide-based cure systems. A full description of the various cross-linking technologies is described in U.S. Pat. No. 5,869,591 and No. 5,977,271, both of which are herein fully incorporated by reference.

For cured resins, suitable curing agents may include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Elemental sulfur may be used as a crosslinking agent for diene containing polymers.

In some systems crosslinking may be promoted with a crosslinking catalyst, and any catalyst that will provide this function can be used in this invention. These catalysts generally include acids and bases, especially organic bases, carboxylic acids and sulfonic acids, and organometallic compounds, including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts.

Rather than employing a chemical crosslinking agent, crosslinking may be effected by use of radiation or by the use of electron beam. Useful radiation types include ultraviolet (UV) or visible radiation, beta ray, gamma rays, X-rays, or neutron rays. Radiation is believed to effect crosslinking by generating polymer radicals which may combine and crosslink.

Dual cure systems, which use a combination of heat, moisture cure, and radiation steps, may be effectively employed. Dual cure systems are disclosed in U.S. Pat. No. 5,911,940 and No. 6,124,370, which are fully incorporated herein by reference. For example, it may be desirable to employ peroxide crosslinking agents in conjunction with silane crosslinking agents; peroxide crosslinking agents in conjunction with radiation; or sulfur-containing crosslinking agents in conjunction with silane crosslinking agents.

The low molecular weight polymers disclosed herein may also be modified by various other cross-linking processes, including, but not limited to, the incorporation of a diene component, as a termonomer, in their preparations, and subsequent cross linking by the aforementioned methods, and further methods, including vulcanization via the vinyl group, using sulfur, for example, as the cross linking agent.

The functionalization may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether and so on, or functional unsaturated compounds, such as maleic anhydride, can be added across a terminal or internal unsaturation via known chemistry. Other functionalization methods include those disclosed in the following U.S. Pat. No. 5,849,828, entitled, "Metalation and Functionalization of Polymers and Copolymers;" U.S. Pat. No. 5,814,708, entitled, "Process for Oxidative Functionalization of Polymers Containing Alkylstyrene;" and U.S. Pat. No. 5,717,039, entitled, "Functionalization of Polymers Based on Koch Chemistry and Derivatives Thereof." Each of these patents is fully incorporated herein by reference.

The polymers disclosed herein may be chlorinated with any of a variety of reagents, including elemental chlorine, and the chlorinated product then reacted with any of a variety of amines, for example, ethylene diamine, to obtain aminated product, useful in fuel and motor oil compositions. See, for example, U.S. Pat. Nos. 3,960,515; 4,832,702; 4,234,235; and WO 92/14806 the disclosures of which are incorporated herein by reference in their entirety. Sulfonation can be conducted according to the methods disclosed in the following U.S. Pat. No. 5,753,774, entitled, "Functional Group Terminated Polymers Containing Sulfonate Group Via Sulfonation of Ethylenically Unsaturated Polymers;" 5,723,550, entitled, "Bulk Sulfonation of EPDM Rubber;" 5,596,128, entitled, "Sulfonating Agent and Sulfonation Process;" 5,030,399, entitled, "Method of In-Mold Sulfonation of Molded Plastic Article;" 4,532,302, entitled, "Process for the Sulfonation of an Elastomeric Polymer;" 4,308,215, entitled, "Sulfonation Process;" 4,184,988, entitled, "Process for the Sulfonation of an Elastomeric Polymer;" 4,157,432, entitled, "Bulk Sulfonation Process;" 4,148,821, entitled, "Process for Sulfonation," all of which are incorporated by reference herein in their entirety.

In accordance with some embodiments of this invention, the polymers with unsaturation are functionalized, for example, with carboxylic acid producing moieties (preferably acid or anhydride moieties) selectively at sites of carbon-to-carbon unsaturation on the polymer chains, preferably in the presence of a free-radical initiator, to randomly attach carboxylic acid producing moieties, that is, acid or anhydride or acid ester moieties, onto the polymer chains.

In one embodiment, this selective functionalization can be accomplished by halogenating, for example, chlorinating or brominating the unsaturated alpha-olefin polymer with chlorine, or bromine at elevated temperatures. The halogenation normally helps increase the reactivity of starting alpha-olefin polymers with monounsaturated functionalizing reactant. The halogenated polymer is then reacted with sufficient monounsaturated reactant capable of adding functional moieties to the polymer, for example, monounsaturated carboxylic reactant, at elevated temperature, such that the product obtained will contain the desired number of moles of the monounsaturated carboxylic reactant per mole of the halogenated polymer. Processes of this general type are taught in U.S. Pat. Nos. 3,087,436; 3,172,892; 3,272,746; which are each incorporated herein by reference.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (for example, C1 to C4 alkyl) acid esters of the foregoing, for example, methyl maleate, ethyl fumarate, and methyl fumarate. Upon reaction with the polymer, the monounsaturation of the monounsaturated carboxylic reactant becomes saturated. Thus, for example, maleic anhydride becomes polymer substituted succinic anhydride, and acrylic acid becomes polymer substituted propionic acid.

In an another embodiment, the unsaturated ethylene interpolymers may be functionalized, selectively at the sites of olefinically unsaturated bonds in the polymer chains, with carboxylic acid, carboxylic ester or thiol ester functional groups via a Koch reaction. A Koch process comprises contacting a polymer composition, comprising at least one polymer having at least one carbon-carbon double bond, with a Koch catalyst. The catalyst is preferably a classical Bronsted acid or Lewis acid catalyst. The Koch reaction is conducted in a manner, and under conditions sufficient, to form a carbenium ion at the site of said carbon-carbon double bond. The carbenium ion is reacted with carbon monoxide to form an acylium cation, which in turn, is reacted with at least one nucleophilic trapping agent, selected from the group consisting of water or at least one hydroxyl or one thiol group containing compound, to form functional groups, for example, carbonyl functional groups, such as carbonyl or thiol carbonyl group-containing compounds, as well as derivatives thereof. Processes for functionalizing unsaturated polymers via a Koch reaction are described more fully in U.S. Pat. No. 5,629,434, entitled "Functionalization of Polymers Based on Koch Chemistry and Derivatives Thereof," and the disclosure of which has been incorporated by reference herein in its entirety.

In other embodiments, the unsaturated ethylene interpolymers may be functionalized with carboxylic acid or ester moieties by reacting the starting polymers with carbon monoxide and an alcohol, in the presence of a protonic acid, and catalyst system, comprising: (a) at least one of the metals palladium, rhodium, ruthenium, iridium and cobalt in elemental or compound form, and (b) a copper compound. Processes of this type are disclosed, for example, in published EP Application 148,592, the disclosure of which is incorporated herein by reference in its entirety.

In still other embodiments, functional groups may be added directly to the interpolymer by a Friedel-Crafts reaction or other electrophilic substitution reaction. Such functional groups include, for example, unsubstituted or substituted alkylcarbonyl, arylcarbonyl, and aralkyl groups; carboxylic acid or sulfonic acid groups or alkyl groups substituted with carboxylic acid or sulfonic acid groups; halogen, and $NO_2$, which can subsequently be transformed to $NH_2$. Preferably such groups include acyl, such as substituted or unsubstituted phenylcarbonyl, carboxyalkylcarbonyl, and substituted or unsubstituted carboxybenzyl. Particularly preferred groups include —C(O)Me, which can be further functionalized to, for example, —$CO_2H$; —C(O)-$pC_6H_4$-Me (which can be further functionalized to, for example, —CH(OH)-$pC_6H_4$-Me); —CH($R_5$)$CH_2CH_2CO_2H$; —CH($R_5$)$CH_2CH_2SO_3H$; and —CH($R_5$)-$pC_6H_4$—$CO_2H$, wherein R5 is independently selected from hydrogen or an alkyl group; and —C(O)$CH_2CH_2CO_2H$. The functional groups containing acid groups can be converted to ionomeric salts, such as zinc ionomers by neutralization. The electrophilic substitution reactions, which have been discovered to be advantageously useful for the substantially random polymers, described above, may be conducted as described in G. A. Olah, Friedel-Crafts and Related Reactions, Vol. II, Part 2, J. Wiley & Sons, N.Y., 1964.

Free Radical Initiators Useful for Initiating Grafting Reactions

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed below. Also shown below, are the respective chemical structures and the theoretical radical yields. The theoretical radical yield is the theoretical number of free radicals that are generated per mole of initiator.

| Initiator Name | Initiator Structure | Theoretical Radical Yield |
| --- | --- | --- |
| Benzoyl peroxide | (structure) | 2 |
| Lauroyl peroxide | (structure) | 2 |
| Dicumyl peroxide | (structure) | 2 |
| t-Butyl α-cumyl peroxide | (structure) | 2 |
| Di-t-butyl peroxide | (structure) | 2 |
| Di-t-amyl peroxide | (structure) | 2 |
| t-Amyl peroxybenzoate | (structure) | 2 |
| 1,1-Bis(t-butylperoxy)-3,3,5-trimethylcyclohexane | (structure) | 4 |
| α,α'-Bis(t-butylperoxy)-1,3-diisopropylbenzene | (structure) | 4 |
| α,α'-Bis(t-butylperoxy)-1,4-diisopropylbenzene | (structure) | 4 |
| 2,5-Bis(t-butylperoxy)-2,5-dimethylhexane | (structure) | 4 |
| 2,5-Bis(t-butylperoxy)-2,5-dimethyl-3-hexyne | (structure) | 4 |

Maleic Anhydride Functionalized Olefin Interpolymers

A preferred embodiment of the invention provides olefin interpolymers, and in particular, ethylene interpolymers (preferably ethylene/α-olefin interpolymers), and propylene interpolymers, each grafted with maleic anhydride. The grafted maleic anhydride olefin interpolymer may or may not contain small amounts of hydrolysis product and/or other derivatives.

In one embodiment, the present invention provides maleic-anhydride grafted polyolefins and polyolefin blends, and, in particular, to maleic anhydride-grafted ethylene interpolymers. Preferably, the maleic anhydride-grafted ethylene interpolymers described below are formed from ethylene/α-olefin interpolymers (base polymers).

In another embodiment, the maleic anhydride-grafted ethylene interpolymers have a melt viscosity less than 50,000 cP, preferably less than 40,000 cP, and more preferably less than 30,000 cP, at 350° F. (177° C.). In another embodiment, the maleic anhydride-grafted ethylene interpolymers are formed from ethylene interpolymers having a molecular weight distribution from about 1 to 5, preferably from about 1 to 4, and more preferably from about 1 to 3.5 or about 1 to 3. All individual values and subranges from about 1 to 5 are included herein and disclosed herein. The invention also provides for adhesive formulations prepared from such maleic anhydride-grafted ethylene interpolymers. Preferably, the maleic anhydride-grafted ethylene interpolymer is formed from an ethylene/α-olefin interpolymer (base polymer).

In another embodiment, the maleic anhydride-grafted ethylene interpolymers have a melt viscosity from 2,000 cP to 50,000 cP (at 350° F. (177° C.)). All individual values and subranges from 2,000 cP to 50,000 cP are included herein and disclosed herein. Melt viscosity is measured using a Brookfield viscometer at 350° F. (177° C.). Preferably, the melt viscosity is from 4,000 cP to 30,000 cP, and more preferably from 6,000 cP and 20,000 cP. Preferably, the maleic anhydride-grafted ethylene interpolymer is formed from an ethylene/α-olefin interpolymer (base polymer).

In another embodiment, the maleic anhydride-grafted ethylene interpolymers have a number average molecular weight from 4,000 to 30,000, preferably from 5,000 to 25,000, and more preferably from 5,000 to 15,000. All individual values and subranges are included in the range 4,000 to 30,000, and disclosed herein. All molecular weights, as disclosed herein, have the unit "g/mole." Preferably, the maleic anhydride-grafted ethylene interpolymer is formed from an ethylene/α-olefin interpolymer (base polymer).

In another embodiment, the maleic anhydride-grafted ethylene interpolymers have a weight average molecular weight from 8,000 to 60,000, preferably from 10,000 to 50,000, and more preferably from 12,000 to 30,000. All individual values and subranges are included in the range 8,000 to 60,000, and disclosed herein.

In another embodiment, the maleic anhydride-grafted ethylene interpolymers have a molecular weight distribution from about 1 to 5, preferably from about 1 to 4, and more preferably from about 1 to 3. All individual values and subranges are included in the molecular weight distribution range about 1 to 5, and disclosed herein. Preferably, the maleic anhydride-grafted ethylene interpolymer is formed from an ethylene/α-olefin interpolymer (base polymer).

In another embodiment, the maleic anhydride-grafted ethylene interpolymers have density from 0.855 g/cm$^3$ to 0.93 g/cm$^3$, and preferably from 0.86 g/cm$^3$ to 0.90 g/cm$^3$, and more preferably from 0.865 g/cm$^3$ to 0.895 g/cm$^3$. All individual values and subranges are included in the density range 0.85 g/cm$^3$ to 0.93 g/cm$^3$, and disclosed herein. Preferably, the maleic anhydride-grafted ethylene interpolymer is formed from an ethylene/α-olefin interpolymer (base polymer).

The present invention further provides a process for preparing the maleic anhydride-grafted ethylene interpolymers of the invention, by grafting maleic moieties to residual unsaturations in the interpolymer chain and/or to saturated groups in the interpolymer chain of an ethylene/α-olefin interpolymer. Preferably, the maleic anhydride-grafted ethylene interpolymer is formed from an ethylene/α-olefin interpolymer (base polymer).

In one embodiment, the amount of maleic anhydride used in the grafting reaction is greater than, or equal to, one weight percent, based on the total weight of the reactive composition, and the weight ratio of maleic anhydride to initiator, is from 10:1 to 500:1, preferably from 20:1 to 400:1, and more preferably from 30:1 to 300:1. The individual ratios and subranges from 10:1 to 500:1 are included herein and disclosed herein. In another embodiment, the weight ratio of maleic anhydride to initiator, is from 10:1 to 50:1. These ratios of maleic anhydride to initiator, balanced with the grafting efficiency of the reaction, have resulted in maleic anhydride-grafted polymers that provide good adhesion properties. Preferably, the maleic anhydride-grafted ethylene interpolymer is formed from an ethylene/α-olefin interpolymer (base polymer).

In yet another embodiment, the ethylene interpolymer contains a ratio of the terminal vinyl groups to the sum of all unsaturations (vinyl, vinylidene, cis, and trans), $R_v$, from 0.001 to 0.5, preferably from 0.01 to 0.4, and more preferably from 0.1 to 0.3, as determined by $^1$H NMR. All individual ratio values and subranges from 0.001 to 0.5 are included and disclosed herein. Preferably, the maleic anhydride-grafted ethylene interpolymer is formed from an ethylene/α-olefin interpolymer (base polymer).

In another embodiment, the amount of maleic anhydride, used in the grafting reaction, is less than, or equal to, 10 weight percent (based on the weight of the reactive composition), preferably less than 5 weight percent, and more preferably from 0.5 to 10 weight percent, and even more preferably from 0.5 to 5 weight percent. All individual values and subranges from 0.05 weight percent to 10 weight percent are included herein and disclosed herein.

In another embodiment, the amount of maleic anhydride constituent grafted on the polyolefin chain (for example, ethylene interpolymer or propylene interpolymer) is greater than 0.05 weight percent (based on the weight of the olefin interpolymer), as determined by titration analysis, FTIR analysis, or any other appropriate method. In a further embodiment, this amount is greater than 0.25 weight percent, and in yet a further embodiment, this amount is greater than 0.5 weight percent. In a preferred embodiment, 0.1 weight percent to 5 weight percent of maleic anhydride is grafted. All individual values and subranges greater than 0.05 weight percent are considered within the scope of this invention, and are disclosed herein. Preferably, the maleic anhydride-grafted ethylene interpolymer is formed from an ethylene/α-olefin interpolymer (base polymer).

The maleic anhydride, as well as many other unsaturated heteroatom containing species, may be grafted to the interpolymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis (isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated interpolymer. For example, the degree of maleic anhydride/succinic anhydride, their oligomers, and their derivatives, including hydrolysis products, grafted onto the grafted interpolymer may be influenced by the aforementioned considerations. Additionally, the degree and type of branching, and the amount of crosslinking, may also be influenced by the reaction conditions and concentrations. In general, it is preferred that crosslinking during the maleation process be minimized. The composition of the base olefin interpolymer may also play a role in the final structure of the maleated interpolymer. The resulting structure, will in turn, affect the properties and use of the final product. Typically, the amount of initiator and maleic anhydride employed will not exceed that, which is determined to provide the desired level of maleation and desired melt flow, each required for the functionalized interpolymer and its subsequent use.

The amount of initiator can vary, but for the adhesive applications of the invention, at least 100 ppm of initiator, preferably at least 250 ppm of initiator, based on the total amount of the reactive composition, is used. The initiator may be present in an amount from 250 ppm to 2500 ppm. All individual values and subranges between 250 ppm and 2500 ppm are included herein and disclosed herein.

The grafting reaction should be performed under conditions that maximize grafts onto the interpolymer backbone, and minimize side reactions, such as the homopolymerization of the grafting agent, which is not grafted to the olefin interpolymer. It is not unusual that some fraction of the maleic anhydride (and/or its derivatives) does not graft onto the olefin interpolymer, and it is generally desired that the unreacted grafting agent be minimized. The grafting reaction may be performed in the melt, in solution, in the solid-state, in a swollen-state, and the like. The maleation may be performed in a wide-variety of equipments, such as, but not limited to, twin screw extruders, single screw extruders, Brabenders, batch reactors, and the like.

It has been found that blending the resin with the maleic anhydride and initiator in the first stage of an extruder, at melt temperatures typically from 100° C. to 260° C., preferably from 120° C. to 250° C., has produced sufficiently maleated resins. All individual temperature values and ranges from 100° C. to 260° C. are included herein and disclosed herein.

Additional embodiments of the invention provide for olefin interpolymers grafted with other carbonyl-containing compounds. In one embodiment, these grafted olefin interpolymers may have molecular weight distributions and/or densities the same or similar to those described above for the grafted maleic anhydride olefin interpolymers. In another embodiment, these grafted olefin interpolymers are prepared using the same or similar amounts of grafting compound and initiator, as those used for the grafted maleic anhydride olefin interpolymers, as described above. In another embodiment, these grafted olefin interpolymers contain the same or similar level of grafted compound as the amount of grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

In another embodiment of the invention, a blend of two of more polyolefins is subject to maleation using maleic anhydride and curing agents as discussed above. The maleic anhydride can be reacted with the polymers of the polyolefin blend by blending the individual polymers with the maleic anhydride and initiator in the first stage of a reactor extruder. The process temperatures at which reaction (maleic anhydride grafting) takes place are typically between 100° C. and 260° C., preferably between 120° C. and 250° C., depending upon the residence time and the half life of the initiator. The grafting reaction should be performed under conditions that maximize grafts onto the polymer backbone, and minimize side reactions.

In one embodiment, the resin blend contains an ethylene interpolymer and a propylene interpolymer. Suitable ethylene interpolymers and propylene interpolymers include, but are not limited to, those described herein.

Compositions and Blends Containing the Functionalized Olefin Interpolymers

The functionalized olefin interpolymers of the invention may be blended with one or more other polymers to improve the performance, processibility and/or cost of the resultant blend.

Suitable polymers for blending with the functionalized olefin interpolymers of the invention include thermoplastic and non-thermoplastic polymers, including natural and synthetic polymers. Exemplary polymers for blending include polypropylene, (both impact modifying polypropylene, isotactic polypropylene, atactic polypropylene, and random ethylene/propylene copolymers), various types of polyethylene (PE), including high pressure, free-radical Low Density Polyethylene (LDPE), Ziegler Natta Linear Low Density Polyethylene (LLDPE), metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, acrylonitrile-butadiene-styrene (ABS), styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example polymers available under the trade designation VERSIFY™, available from The Dow Chemical Company, and VISTAMAXX™, available from ExxonMobil, can also be useful as components in blends comprising the functionalized interpolymers.

Additional polymers for blending include, but are not limited to, polyamides, polyesters, polycarbonate, other engineering thermoplastics, polyvinyl alcohol, polyvinylidene chloride, polyvinyl chloride, and natural products, such as cellulose and wool fibers. Suitable polyamides include, but are not limited to, aliphatic polyamides, such as polycaprolactam (nylon 6), poly(hexamethylene adipamide) (nylon 6,6), poly(hexamethylene sebacamide); and aromatic polyamides (or polyaramides). Suitable polyesters include, but are not limited to, poly(ethylene terephthalate) (PET) and poly(butylene terephthalate) (PBT). Thermoset systems such as epoxies, unsaturated polyesters, and the like, may have the functionalized multi-block polymers blended into them prior to curing or during the curing of the thermoset system.

In one embodiment, the invention provides thermoplastic compositions, comprising a thermoplastic matrix polymer, especially a polyamide, polyester or a polyolefin, such as polypropylene, and a dispersed phase, containing a core-shell or core-multiple shell morphology; the shell comprising a functionalized interpolymer, according to the invention, and the core comprising the multi-block unfunctionalized interpolymer and/or other types of polyolefins. In another embodiment, the core comprises a functionalized interpolymer according to the invention.

The base unfunctionalized interpolymer may also form inner core-shell type particles having hard crystalline or semi-crystalline blocks in the form of a "core," surrounded by soft or elastomeric blocks, forming a "shell" around the occluded domains of hard polymer. These particles may be formed and dispersed within the matrix polymer by the forces incurred during melt compounding or blending.

This desired core-shell or core-multiple shell morphologies may result from, or be enhanced by, chemical interactions between the functionalized moiety of the base interpolymer and the matrix resin. These chemical interactions may result in covalent bonds or noncovalent associations. For example, maleic anhydride grafts can form amide linkages with terminal amines of a polyamide, or form ester linkages with terminal hydroxyls of a polyester. The chemical interactions may also arise from enhanced associations between the functional groups of the functionalized olefin interpolymers and chemical moieties in the matrix polymer. Such associations include, but are not limited to, dipole-dipole interactions, hydrogen bonding, hydrophilic interactions and hydrophobic interactions.

Blends, as described herein, may be prepared by mixing or kneading the respective components at a temperature around, or above, the melt point temperature of one or both of the components. For some functionalized multi-block copolymers, this temperature may be above 90° C., most generally above 100° C., and most preferably above 110° C. Typical polymer mixing or kneading equipment, capable of reaching the desired temperatures and capable of melt plastifying the mixture, may be employed. These include mills, kneaders, extruders (both single screw and twin-screw), Banbury mixers, calenders, and the like. The sequence of mixing, and method, may depend on the final composition. A combination of Banbury batch mixers and continuous mixers may also be employed, such as a Banbury mixer, followed by a mill mixer, followed by an extruder.

The blend compositions may contain processing oils, plasticizers, and processing aids. Rubber processing oils have a certain ASTM designation, and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

The thermoplastic compositions of this invention, including the foregoing blends, may be processed by conventional molding techniques, such as injection molding, extrusion molding, thermoforming, slush molding, over molding, insert molding, blow molding, and other techniques. Films, including multi-layer films, may be produced by cast or tentering processes, including blown film processes.

Additives

Typically polymers and resins used in the invention are treated with one or more stabilizers, for example, antioxidants, such as Irganox™ 1010 and Irgafos™ 168, both supplied by Ciba Specialty Chemicals. Polymers are typically treated with one or more stabilizers before an extrusion or other melt processes. Other polymeric additives include, but are not limited to, ultraviolet light absorbers, antistatic agents, pigments, dyes, nucleating agents, fillers slip agents, fire retardants, plasticizers, processing aids, lubricants, stabilizers, smoke inhibitors, viscosity control agents and anti-blocking agents.

Thermoplastic compositions and thermoset compositions, each containing functionalized ethylene/α-olefin, according to the invention, may also contain organic or inorganic fillers, or other additives, such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titanium dioxide and other titanates. Silane based coupling agents or other coupling agents may also be employed for better filler bonding.

Adhesive Compositions

Adhesive compositions (hot melt adhesive (HMA) and pressure sensitive adhesives (PSA)), based on one or more functionalized polymers or blends, as described above, can prepared by conventional techniques, such as melt blending the constituents of the formulation in a mixing device, with or without curing catalysts. The adhesive compositions of the present invention have viscosities which are amenable to application temperatures of less than 300° F. (149° C.). In a preferred embodiment, the adhesives are formulated with maleic anhydride-grafted (MAH-grafted) ethylene interpolymers.

The viscosity of the adhesive compositions will depend on the end use application. For carton and sealing adhesives, viscosities in the range of 500-1500 cP, at 350° F. (177° C.), are typical.

The adhesive compositions are further characterized as having low densities amenable to recycling and repulping processes. The adhesives also exhibit excellent cold temperature flexibility. This combination of properties makes these adhesives well suited for low application temperature packaging adhesives, as well as general purpose packaging adhesives.

The functionalized polymers or blends, as discussed above, will preferably be present in amounts from 20 percent to 65 percent by weight, based on the total weight of the adhesive formulation. All individual values and subranges from 20 percent to 65 percent are include herein and disclosed herein. Preferably, the functionalized polymers or blends will be present in an amount from 25 percent to 45 percent by weight, and more preferably from 30 percent to 40 percent by weight.

Additionally, or in the alternative, the functionalized polymers or blends may be combined with one or more of the following: (a) other homopolymers, copolymers and terpolymers of ethylene, including, but not limited to, low density polyethylene, as well as grafted and maleated versions, ethylene vinyl acetate copolymers, ethylene n-butyl acrylate copolymers, ethylene methylacrylate copolymers; (b) homopolymers, copolymers and terpolymers of propylene; (c) rubbery block copolymers, including those having the general configuration A-B-A triblocks, A-B-A-B-A-B multiblocks, A-B diblocks and radial block copolymers; and (d) other olefin-based polymers. Suitable polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), VESTOPLAST™ polymers (Degussa), and high impact polypropylene. Other suitable polymers include low molecular weight polyolefins, as described in U.S. Pat. Nos. 5,917,100; 5,750,813 and 6,107,530; which are all incorporate herein, in their entirety, by reference. The additional polymers may be used in amounts up to about 20 weight percent, however, the amount of the additional polymers may increase or decrease, and will depend on the desired properties and application(s) of the final adhesive.

In one embodiment, an adhesive composition contains at least the following:
a) from 20 percent to 100 percent, and preferably from 20 percent to 65 percent, by weight of the adhesive, of at least one functionalized ethylene interpolymer (preferably an ethylene/α-olefin interpolymer), having a melt viscosity less than 50,000 cP (at 350° F. (177° C.)), a molecular weight distribution greater than 1, and less than, or equal to, 3.5, and a density from 0.855 to 0.895 g/cm³;
b) from 0 percent to 60 percent, and preferably from 10 percent to 60 percent, by weight of the adhesive, of at least one tackifying resin; and
c) from 0 to 40 percent, or 5 to 35 percent, by weight of the adhesive, of at least one wax.

In another embodiment the adhesive composition contains at least the following:
(a) from 25 to 100 percent, by weight in the adhesive, of at least one functionalized ethylene interpolymer (preferably an ethylene/α-olefin interpolymer), having a density of 0.86 to 0.88 g/cm³, and a melt viscosity at 350° F. (177° C.) of from 3,500 to 30,000 cP;
(b) from 0 to 50 percent, or 5 to 45 percent, by weight, of the adhesive, of at least one tackifier;
(c) from 0 to 35 percent, or 5 to 30 percent, by weight, of the adhesive, of at least one wax, which is preferably selected from paraffinic wax, microcrystalline wax, synthetic wax, degradation wax, or a wax prepared from a metallocene or constrained geometry catalyst and having a density of 0.885 to 0.97 g/cm³, and a melt viscosity at 350° F. (177° C.) from 10 to 2,000 cP, or combinations thereof.

In another embodiment, the adhesive composition contains at least one maleic anhydride-grafted ethylene interpolymer (preferably a grafted ethylene/α-olefin interpolymer) and/or at least one maleic anhydride-grafted propylene interpolymer (preferably a grafted propylene/α-olefin interpolymer or a grafted propylene/ethylene interpolymer), and where the maleic anhydride grafted polymer or polymers are present in an amount from 15 to 100 weight percent, preferably from 15 to 60 weight percent, based on the total weight of the composition, and the composition further contains 0 to 40 weight percent or 5 to 35 weight percent of at least one tackifier, based on the total weight of the composition, and 0 to 40 weight percent or 5 to 35 weight percent of at least one oil, based on the total weight of the composition.

In another embodiment, the adhesive composition contains at least one maleic anhydride-grafted ethylene interpolymer (preferably a grafted ethylene/α-olefin interpolymer) and/or at least one maleic anhydride-grafted propylene interpolymer (preferably a grafted propylene/α-olefin interpolymer or a grafted propylene/ethylene interpolymer), and where the maleic anhydride grafted polymer or polymers are present in an amount from 15 to 100 weight percent, preferably from 15 to 60 weight percent, based on the total weight of the composition, and the composition further comprises 0 to 40 weight percent or 5 to 35 weight percent of at least one tackifier, based on the total weight of the composition, and 0 to 40 weight percent or 5 to 35 weight percent of at least one wax, based on the total weight of the composition.

The waxes useful herein include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Suitable waxes also include those described in U.S. Pat. Nos. 6,335,410; 6,054,544 and 6,723,810; which are all incorporated herein, in their entirety, by reference.

Exemplary tackifying resins include, but are not limited to, aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof. Tackifying resins having a ring and ball softening point from 70° C. to 150° C., will typically have a viscosity at 350° F. (177° C.), as measured using a Brookfield viscometer, of no more than 3000 centipoise. Useful examples include Eastotac® H-100, H-115 and H-130, and H-142 from Eastman Chemical Co. in Kingsport, Tenn., which are partially hydrogenated cycloaliphatic petroleum hydrocarbon resins, with softening points of 100° C., 115° C. and 130° C. and 142° C., respectively. These resins are available in the E grade, R grade, L grade and W grade, indicating differing levels of hydrogenation, with E being the least hydrogenated and W being the most hydrogenated.

Other useful tackifying resins include Escorez® 5300, 5637 and 5400, partially hydrogenated cycloaliphatic petroleum hydrocarbon resins, and Escorez® 5600, a partially hydrogenated aromatic modified petroleum hydrocarbon resin. All of these resins are available from ExxonMobil Chemical Co., in Houston, Tex. Other tackifying resins include Wingtack® Extra, which is an aliphatic, aromatic petroleum hydrocarbon resin available from Goodyear Chemical Co., in Akron, Ohio; Hercolite® 2100, a partially hydrogenated cycloaliphatic petroleum hydrocarbon resin; and Zonatac® 105 and 501 Lite, which are styrenated terpene resins made from d-limonene and available from Arizona Chemical Co., in Panama City, Fla.

Stabilizer and antioxidants may be added to protect the adhesive from degradation, caused by reactions with oxygen, which are induced by such things as heat, light or residual catalyst from the raw materials. Lowering the temperature of application, as in the present invention, also helps to reduce degradation. Such antioxidants are commercially available from Ciba-Geigy located in Hawthorn, N.Y., and include Irganox® 565, 1010 and 1076, which are hindered phenolic antioxidants. These are primary antioxidants, which act as free radical scavengers, and may be used alone or in combination with other antioxidants, such as phosphite antioxidants, like Irgafos® 168, available from Ciba-Geigy. Phosphite antioxidants are considered secondary antioxidants that are not generally used alone, and are primarily used as peroxide decomposers. Other available antioxidants include, but are not limited to, Cyanox® LTDP, available from Cytec Industries in Stamford, Conn., and Ethanox® 1330, available from Albemarle Corp. in Baton Rouge, La. Many other antioxidants are available for use by themselves, or in combination with other such antioxidants. When employed, the antioxidant is typically present in an amount less than 1.0 weight percent, preferably less than 0.5 weight percent, based on the total weight of the adhesive formulation.

The adhesive may further comprise an oil. Oils are typically employed to reduce the viscosity of the pressure sensitive adhesive. When employed, oils will be present in an amount less than 50, preferably less than 40, and more preferably less than 35 weight percent, based on the weight of the adhesive formulation. Exemplary classes of oils include, but are not limited to, white mineral oil (such as Kaydol® oil available from Witco), and Shellflex® 371 naphthenic oil (available from Shell Oil Company) and Calsol 5550 (napthenic oil from Calumet Lubricants).

The adhesives may be prepared by standard melt blending procedures. In particular, the maleic anhydride-grafted polymer or blend, tackifier(s) and other components may be melt blended until a homogeneous mix is obtained. Any mixing method producing a homogeneous blend, without degrading the adhesive components is satisfactory, such as a vessel equipped with a stirrer, and an optional heating mechanism.

Further, the components of an adhesive formulation may be added to an extrusion coater for application to the substrate. The adhesives can be provided in forms, such as pellets, pillows, chiclets, drages or any other desired configurations.

The adhesives are ideally suited for use in the packaging industry for case and carton sealing and for tray forming. These packages may be manufactured from materials, such as virgin and recycled kraft, high and low density kraft, chipboard and various types of treated and coated kraft and chipboard, and corrugated versions of these materials. These adhesives may also bond composite materials, such as those types of packages used for packaging of alcoholic beverages. These composite materials may include chipboard laminated with an aluminum foil, which is further laminated to film materials, such as polyethylene, Mylar™, polypropylene, polyvinylidene chloride, ethylene vinyl acetate and various other types of films. Such film materials may also be bonded directly to chipboard or kraft in the absence of aluminum foil. One of ordinary skill in the art would recognize that the adhesive formulations of the invention can be used with a variety of substrates used in the packaging industry.

The adhesives may also be used in a variety of applications, including, but not limited to, case and carton sealing, automotive, graphic arts, nonwovens, panel assembly, high performance tapes, woodworking applications (for example, woodworking HMAs, furniture adhesives, wood flooring adhesives, other adhesives for the construction of wooden structures), contact hot melt adhesives, paperboard coatings, inks, personal care and cosmetic products, sealants, color and additive concentrates, carpet-tape adhesives, woodworking adhesives, and profile wrap adhesives.

Other Applications Based on the Maleic Anhydride-Grafted Polymers and Blends

The maleic anhydride-grafted polymers or blends can be blended with one or more thermoplastic or thermosetting polymers, and used in other applications.

Polymers include the natural or synthetic resins, such as, for example, styrene block copolymers, rubbers, linear low density polyethylene (LLDPE), high density polyethylene (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanates, ethylene ethylacrylate polymers (EEA), ethylene styrene interpolymers (ESI), epoxies, polyurethanes, as well as graft-modified olefin polymers, and combinations of two or more of these polymers.

The blend compositions of the present invention can be used in a variety of applications including thermoforming, blow molding, injection molding and overmolding, calendaring, fiber forming processes, wire and cable, extrusion coatings and dispersions.

Processing aids, which are also referred to as plasticizers, can also be included in either the individual blend components or added to the final blend. These include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as Kaydol™ oil (available from and a registered trademark of Witco) and Shellflex™ 371 naphthenic oil (available from and a registered trademark of Shell Oil Company). Another suitable oil is Tuflo™ oil (available from and a registered trademark of Lyondell).

The maleic anhydride-grafted polymers of the present invention can also be used to enhance polymer adhesion in hot melt adhesives, extrusion coating and lamination systems, when used as a blend component.

Yet another advantage of the maleic anhydride-grafted polymers of the present invention is that their low crystallinities allow them to be loaded with high levels of fillers (e.g., talc, carbon black, silica, magnesium hydroxide, calcium carbonate, aluminum trihydrate, etc.) and/or other additives such as antioxidants (e.g., Irganox 1010, a hindered phenolic; Irgafos 168, a phosphite; etc.), cling additives (e.g., polyisobutylene), antiblock additives, colorants, pigments, waxes, nucleating agents, extender oils, flame retardants, tackifers and the like. The amount of filler that can be incorporated into the maleic anhydride-grafted polymer is limited only by the molecular structure of the filler-containing composition, and/or the extent that the filler does not interfere with the other enhancements brought by the polymer. Solids levels of 70 wt %, 80 wt %, or more, based on the combined weight of the composition and filler may be achieved. This high loading capacity is particularly useful in masterbatch applications, e.g., using a relatively small amount of polymer to introduce one or more fillers and/or additives into a much larger amount of a composition.

DEFINITIONS

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt viscosity, melt index, number average molecular weight, weight average molecular weight, molecular weight distribution, various temperatures, such as melting and crystallization temperatures ($T_m$, $T_c$), percent crystallinity, amount of functionalizing agent, amount of initiator, amount of curing catalyst, "carbonyl-containing compound": initiator ratio, percent comonomer, amount of grafted carbonyl-containing compound, ratio of terminal vinyl unsaturation, density and other properties.

The term "composition," as used herein, includes a mixture of materials which comprise the composition, as well as reaction products and decomposition products formed from the materials of the composition.

The terms "blend" or "polymer blend," as used herein, mean a mixture of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter. The terms "ethylene/α-olefin polymer" and "propylene/α-olefin polymer" are indicative of interpolymers as described below.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene interpolymer," as used herein, refers to an ethylene-based interpolymer that contains greater than 50 mole percent polymerized ethylene monomers, based on total moles polymerizable monomers.

The term, "ethylene/α-olefin interpolymer," as used herein, refers to an ethylene-based interpolymer that contains greater than 50 mole percent polymerized ethylene monomers, based on total moles polymerizable monomers, and an α-olefin, and optionally, additional monomer(s).

The term, "propylene interpolymer," as used herein, refers to a propylene-based interpolymer that contains greater than 50 mole percent polymerized propylene monomers, based on total moles of polymerizable monomers.

The term, "propylene/α-olefin interpolymer," as used herein, refers to an propylene-based interpolymer that contains greater than 50 mole percent polymerized propylene monomers, based on total moles polymerizable monomers, and an α-olefin, and optionally, additional monomer(s).

The term, "propylene/ethylene interpolymer," as used herein, refers to an propylene-based interpolymer that contains greater than 50 mole percent polymerized propylene monomers, based on total moles polymerizable monomers, and ethylene, and optionally, additional monomer(s).

The terms "functionalized polyolefin," "functionalized interpolymer," "functionalized ethylene interpolymer," "functionalized propylene interpolymer" and similar terms, as used herein, refer to one or more functionalization agents (for example, the unsaturated compound, such as maleic anhydride, etc.) on (bonded to) the backbone of the polyolefin. Such moieties may be linked within the polymeric structure (as pendant groups), or linked at a terminal of the polymer structure, and one or more functional moieties may be linked together at a particular position along the backbone. In addition, this term also includes minor amounts of functional moieties that connect two or more polymeric chains, for example, by a reaction, prior to any significant degree of crosslinking of the grafted polymer (for example, greater than a 200 percent increase in melt viscosity, at 350° F., relative to the base polymer).

The terms "maleic anhydride-grafted," "MAH-grafted" and similar terms, as used herein, refers to the chemical linkage of moieties containing anhydride groups, derived from one or more maleic anhydride compounds, on (bonded to) the backbone of a polymeric structure. Such moieties may be linked within the polymeric structure (as pendant groups), or linked at a terminal of the polymer structure, and one or more maleic anhydride moieties may be linked together at a particular position along the backbone. In addition, this term also includes minor amounts of maleic anhydride moieties that connect two or more polymeric chains, for example, by a crosslinking reaction, prior to any significant degree of crosslinking of the grafted polymer (for example, greater than a 200 percent increase in melt viscosity, at 350° F., relative to the base polymer).

The term "reactive composition," used in reference to a functionalization reaction, such as a maleic anhydride grafting reaction, refers to all of the reaction reagents, and typically refers to the "base polymer, functionalization agent and initiator."

The terms "homogeneous" and "homogeneously-branched" are used in reference to an ethylene/α-olefin polymer (or interpolymer), in which the α-olefin comonomer is randomly distributed within a given polymer molecule, and substantially all of the polymer molecules have the same ethylene-to-comonomer ratio.

The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992. Commercial examples of homogeneously branched linear ethylene/α-olefin interpolymers include TAFMER™ polymers supplied by the Mitsui Chemical Company, and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer.

In addition, the substantially linear ethylene interpolymers are homogeneously branched ethylene polymers having long chain branching. The long chain branches have the same comonomer distribution as the polymer backbone, and can have about the same length as the length of the polymer backbone, and have a carbon length greater that the carbon length due to the incorporation of one comonomer. "Substantially linear," typically, is in reference to a polymer that is substituted, on average, with 0.01 long chain branches per 1000 total carbons to 3 long chain branches per 1000 total carbons.

Some polymers may be substituted with 0.01 long chain branches per 1000 total carbons to 1 long chain branch per 1000 total carbons, more preferably from 0.05 long chain branches per 1000 total carbons to 1 long chain branch per 1000 total carbons, and especially from 0.3 long chain branches per 1000 total carbons to 1 long chain branch per 1000 total carbons.

Commercial examples of substantially linear polymers include the ENGAGE™ polymers (available from The Dow Chemical Company), and AFFINITY™ polymers (available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$, or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Backbone" refers to a discrete molecule, and "polymer" or "bulk polymer," refer, in the conventional sense, to the polymer as formed in a reactor.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3), p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112, and Wood-Adams, P. M.; Dealy, J. M.; deGroot, A. W.; Redwine, O. D. *Macromolecules,* 2000, 33, 7489-7499. Additionally, a combination of rheological and solution methods has also proven useful to detect low levels of long chain branching, in which the zero shear viscosity and weight average molecular weight from gel permeation chromatography are used, in reference to a linear standard, to detect long chain branching. See for example, R. L. Sammler, T. P. Karjala, W. Huang, M. A. Mangnus, L. G. Hazlitt, and M. S. Johnson, SPE ANTEC Proceedings, Chicago, p. 1023 (2004).

In contrast to "substantially linear ethylene polymer," "linear ethylene polymer" means that the polymer lacks measurable or demonstrable long chain branches, that is, typically, the polymer is substituted with an average of less than 0.01 long chain branch per 1000 total carbons.

Measurements

Melt Viscosity

Melt viscosity is determined in accordance with the following procedure, using a Brookfield Laboratories DVII+ Viscometer and disposable aluminum sample chambers. The spindle used, is a SC-31 hot-melt spindle, suitable for measuring viscosities in the range of from 10 to 100,000 centipoises. The sample is poured into the chamber, which is in turn, inserted into a Brookfield Thermosel, and locked into place. The sample chamber has a notch on the bottom that fits the bottom of the Brookfield Thermosel to ensure that the chamber is not allowed to turn when the spindle is inserted and spinning. The sample is heated to the required temperature, until the melted sample is about 1 inch (approximately 8 grams of resin) below the top of the sample chamber. The viscometer apparatus is lowered and the spindle submerged into the sample chamber. Lowering is continued until brackets on the viscometer align on the Thermosel. The viscometer is turned on, and set to operate at a shear rate which leads to a torque reading in the range of 30 to 60 percent. Readings are taken every minute for about 15 minutes, or until the values stabilize, at which point, a final reading is recorded.

Gel Permeation Chromatography

The average molecular weights and molecular weight distributions for ethylene-base polymers are determined with a chromatographic system consisting of either a Polymer Laboratories Model PL-210 or a Polymer Laboratories Model PL-220. The column and carousel compartments are operated at 140° C. for polyethylene-based polymers. The columns are three Polymer Laboratories 10-micron, Mixed-B columns. The solvent is 1,2,4 trichlorobenzene. The samples are prepared at a concentration of 0.1 gram of polymer in 50 milliliters of solvent. The solvent used to prepare the samples contains 200 ppm of butylated hydroxytoluene (BHT). Samples are prepared by agitating lightly for 2 hours at 160° C. The injection volume is 100 microliters, and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using Viscotek TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

By the term "MI," is meant melt index, $I_2$, in g/10 min, measured using ASTM D-1238-03, Condition 190° C./2.16 kg for polyethylene based sample (Condition 230° C./2.16 kg for polypropylene based sample). Melt indexes are also determined from Brookfield viscosity as described in U.S. Pat. Nos. 6,335,410; 6,054,544; 6,723,810.

The notation "$I_{10}$" refers to a melt index, in g/10 min, measured using ASTM D-1238-03, Condition 190° C./10.0 kg (Condition 230° C./2.16 kg) for polypropylene.

Differential Scanning Calorimetry (DSC) is used to measure crystallinity in polyethylene (PE) based samples and polypropylene (PP) based samples. A sample is pressed into a thin film at a temperature of 190° C. About five to eight milligrams of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) of each interpolymer sample (base polymer, MAH-grafted polymer) is determined from the second heat curve obtained from DSC, as described above. The crystallization temperature ($T_a$) is measured from the first cooling curve.

Density is measured in accordance with ASTM D-792-00. The density measured was a "quick density", meaning that the density was determined after 1 hour from the time of molding.

The % xylene extractables were measured according to ASTM D-2765-01 Procedure A.

Softening point was measured according to ASTM D-3104, with a Mettler-Toledo FP900 thermosystem. This system consists of the FP90 central processor, used as a control and evaluation unit for the measuring cell, and the FP83, which is the measuring cell, used to determine the softening point.

Proton Nuclear Magnetic Resonance ($^1$H NMR) Spectroscopy—End Group $^1$H NMR analysis was used to determine the end group structure. Samples were prepared by adding approximately 0.100 g of polymer in 2.5 ml of solvent in a 10 mm NMR tube. The solvent was a 50/50 mixture of 1,1,2,2-tetrachloroethane-d2 and perchlorethylene. The samples were dissolved and homogenized by heating and vortexing the tube, and its contents, at 110° C. The data were collected using a Varian Unity Plus 400 MHz NMR spectrometer. The acquisition parameters used for the Presat experiment include a pulse width of 30 µs, 200 transients per data file, a 1.6 sec acquisition time, a spectral width of 10000 Hz, a file size of 32K data points, temperature setpoint 110° C., D1 delay time 4.40 sec, Satdly 4.0 sec, and a Satpwr of 16.

The ratio of the terminal vinyl groups to the sum of all of the unsaturations, $R_v$, is defined below. As mentioned above, $R_v$ may be determined using $^1$H NMR spectroscopy, or if that is indeterminative, by $^{13}$C NMR spectroscopy, under conditions where the intensity of the peaks corresponding to the different carbons in the sample is directly proportional to the total number of contributing nuclei in the sample. The $R_v$ value is defined as:

$$R_v = \frac{[\text{vinyl}]}{[\text{vinyl}] + [\text{vinylidene}] + [cis] + [trans]},$$

where [vinyl] is the concentration of vinyl groups in the isolated polymer in vinyls/1,000 carbon atoms; [vinylidene], [cis], and [trans] are the concentration of vinylidene, cis and trans vinylene groups in the isolated polymer in amount/1,000 carbon atoms, respectively. The amount of each unsaturation and the amount of backbone carbon (CH2) can be determined from the peak intergration of each respective peak, as known in the art. Each integral is normalized to the 1,1,2,2-tetrachhloroethane-d2 region.

Fourier Transform Infrared Spectroscopy (FTIR) Analysis Maleic Anhydride Content.

The concentration of maleic anhydride is determined by the ratio of peak heights of the maleic anhydride at wave number 1791 cm$^{-1}$ to the polymer reference peak, which, in case of polyethylene, is at wave number 2019 cm$^{-1}$. Maleic anhydride content is calculated by multiplying this ratio with the appropriate calibration constant. The equation used for maleic grafted polyolefins (with reference peak for polyethylene) has the following form, as shown in Equation 1.

MAH(wt. %)=$A$*{[FTIR PeakArea@1791 cm−1]/
[FTIR PeakArea 2019 cm−1/+$B$*[FTIR
PeakArea@1712 cm−1]/[FTIR_PeakArea@2019
cm−1]} (Eqn. 1)

The calibration constant A can be determined using C13 NMR standards. The actual calibration constant may differ slightly depending on the instrument and polymer. The second component at wave number 1712 cm$^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm$^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for 1 hour. Mylar and Teflon are suitable protective films to protect the sample from the platens. Aluminum foil must never be used (maleic anhydride reacts with aluminum). Platens should be under pressure (~10 ton) for about 5 minutes.

The sample is allowed to cool to room temperature, placed in an appropriate sample holder, and then scanned in the FTIR. A background scan should be run before each sample scan, or as needed. The precision of the test is good with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate the sample tends to oxidize resulting in an infrared peak at approximately 1740 cm$^{-1}$, which will cause the values for the graft level to be too low.

Typical FTIR spectra for a MAH grafted polyethylene are shown in FIG. 1. Maleic anhydride and acid are represented by peaks at about 1791 and 1712 cm$^{-1}$, respectively. The top spectrum shows the effect of aging/hydrolysis on the MA grafted polymer. The bulk of the material has converted over to the acid form at 1712 cm$^{-1}$. The bottom spectrum shows the effect of vacuum heating the sample at 150° C. for about an hour. Most of the acid is converted back to the anhydride, at 1791 cm$^{-1}$. The recommended baselines and peak heights are outlined on the bottom spectra.

EXPERIMENTAL

Maleic Anhydride Grafting of High Melt Flow Polyolefins Using Reactive Extrusion Three random ethylene/octene copolymers, EO1, EO2, and EO (200 MI), with the properties discussed below, were grafted with maleic anhydride. The maleic anhydride to peroxide ratio in the liquid masterbatch varied from 12:1 to 14:1. The resin and the maleic anhydride/peroxide masterbatch were fed into the extruder at a certain wt % of the masterbatch. Both the EO1 and EO2 copolymers were stabilized with Irganox™ 1010, available from Ciba Specialty Chemicals.

EO1 is a random ethylene/octene copolymer with the following properties: density of 0.87 g/cc, melt viscosity of 8200 cP at 350° F. (177° C.), a melt index ($I_2$) of 1000 g/10 min at 190° C./2.16 kg, and a percent crystallinity around 16.

EO2 is a random ethylene/octene copolymer with a density of 0.874 g/cc, a melt viscosity of 17,000 cP at 350° F. (177° C.), a melt index ($I_2$) of 500 g/10 min at 190° C./2.16 kg, and a percent crystallinity around 18.

EO3 (200 MI) is a random ethylene/octene copolymer with a density of 0.870 g/cc, and a melt index ($I_2$) of 200 g/10 min at 190° C./2.16 kg.

Representative Procedure

Maleic anhydride briquettes from Huntsman were ground into small particulates, and added, at the desired ratios, with Trigonox 101 peroxide, from Akzo-Nobel, to EO1, or EO2 polymers from Dow Chemical. The components were mixed in a Henschel solids blender. The pre-blend was added to the feed throat of a co-rotating twin screw, continuous extruder Berstoff ZE 25E, with seven barrel sections. The mixture was continuously extruded though a die plate into a strand, quenched in a water trough, and cut into pellets. The pellet water temperature was maintained ice cold, below 10° C., to ease strand cutting of the extruded polymer. During the extrusion, a portion of the unreacted maleic anhydride was removed from the extruder through a vacuum vent, set at −25 to −28 inches Hg (−635 mm Hg), located at barrel 5 towards the end of the extruder. Nitrogen was added at the extruder feed hopper to provide an inert atmosphere for the polymer, and to prevent premature oxidation. Extruder conditions are listed in Table 1.

TABLE 1

Extruder Examples

| | SAMPLE | | | |
|---|---|---|---|---|
| | #3 500 MI POX MAH | #4 500 MI POX MAH | #2 1000 MI POX MAH | #1 1000 MI POX MAH |
| Screw RPM | 452 | 452 | 452 | 452 |
| Die Pressure (PSI) | 240 | 370 | 290 | 380 |
| Melt Temp. (° C.) | 124 | 123 | 119 | 121 |
| AMP Load | 5 | 5 | 5 | 5 |
| Set Barrel Temp. Zone 1 (° C.) | 190 | 180 | 153 | 164 |
| Set Barrel Temp. Zones 2-4 (° C.) | 240 | 240 | 238-240 | 240 |
| Set Barrel Temp. Zone 5 (° C.), vent | 100 | 138 | 151 | 152 |
| Set Barrel Temp. Zone 6 (° C.) | 100 | 124 | 128 | 156 |
| Set Die Temp. (° C.) | 100 | 100 | 100 | 100 |
| Main Feeder (lb/hr) | 9 | 9 | 9 | 9 |
| Main Feeder RPM | 880 | 880 | 880 | 880 |
| POX Feeder - Amt. POX* (ppm) | 1200 | 1800 | 1800 | 1200 |
| MAH Feeder - Amt. MAH** (wt %) | 1.5 | 2.5 | 2.5 | 1.5 |

*POX = peroxide
**MAH = maleic anhydride

The weight percentage of the peroxide and maleic anhydride added to the extruder is varied to balance the graft level with the grafting efficiency and the polymer viscosity. Typically, the higher the concentration of the peroxide utilized for a given added concentration of MAH, the higher is the level of grafting and grafting efficiency achieved, but the viscosity of the graft polymer increases. The higher level of peroxide is required to reach the higher levels of MAH grafting. A sample of the finished pellets, after extrusion, was formed into a film, and then examined by the FTIR method to determine the amount of MAH present in the resin. A summary of the grafting results is shown in Table 2. The amount of MAH (wt %) and peroxide (ppm) are each based on the total weight of the reactive composition (polymer+MAH+peroxide).

TABLE 2

Summary of Grafting Results

| Sample # | Base Resin | MAH added to extruder, wt % | Peroxide, added to extruder ppm | MAH Grafted Wt % |
|---|---|---|---|---|
| 1 | EO1 | 1.5 | 1200 | 0.81 |
| 2 | EO1 | 2.5 | 1800 | 0.65 |
| 3 | EO2 | 1.5 | 1200 | 0.55 |
| 4 | EO2 | 2.5 | 1800 | 0.68 |

Physical properties of the base polymers and grafted polymers are shown in Table 3.

TABLE 3

Physical Properties of the Base Resin and MAH-grafted Resin

| | EO1 | EO2 | MAH-g-EO1 (sample #1, 0.81 wt % grafted MAH) | MAH-g-EO1 (Sample #2, 0.65 wt % grafted MAH) | MAH-g-EO2 (Sample #3, 0.55 wt % grafted MAH) | MAH-g-EO2 (Sample #4, 0.68 wt % grafted MAH) |
|---|---|---|---|---|---|---|
| Density (g/cc) | 0.8702 | 0.8738 | 0.8771 | 0.8786 | 0.8772 | 0.8827 |
| Viscosity @ 300° F. (149° C.) cP | 15,617 (15.617 Pa · s) | 31,443 (31.443 Pa · s) | 32,213 (32.213 Pa · s) | 42,832 (42.832 Pa · s) | 50,989 (50.989 Pa · s) | 58,488 (58.488 Pa · s) |
| Viscosity @ 350° F. (177° C.) cP | 7,858 (7.858 Pa · s) | 15,747 (15.747 Pa · s) | 12,797 (12.797 Pa · s) | 16,377 (16.377 Pa · s) | 22,195 (22.195 Pa · s) | 24,545 (24.545 Pa · s) |
| Viscosity @ 374° F. (190° C.) cP | 5,979 (5.979 Pa · s) | 11,957 (11.957 Pa · s) | 9,013 (9.013 Pa · s) | 10,753 (10.753 Pa · s) | 16,317 (16.317 Pa · s) | 17,276 (17.276 Pa · s) |
| Melt Index* 190° C./2.16 kg (g/10 min) | 1037 | 558 | 672 | 539 | 410 | 375 |
| $T_m$ (° C.) | 69.4 ($T_{m1}$) 52.6 ($T_{m2}$) | 71.4 ($T_{m1}$), 57.2 ($T_{m2}$) | 67.4 | 68.0 | 73.6 | 72.9 |
| $T_c$ (° C.) | 54.3 ($T_{c1}$) 35.0 ($T_{c2}$) | 53.1 ($T_{c1}$), 32.3 ($T_{c2}$) | 51.4 ($T_{c1}$), 34.8 ($T_{c2}$) | 51.7 ($T_{c1}$), 34.5 ($T_{c2}$) | 57.8 | 57.7 |
| Softening Point (° C.) | 81.0 | 84.7 | 85.7 | 86.4 | 90.2 | 88.5 |
| % Cryst. | 16 | 18 | 18 | 17 | 18 | 18 |
| Mw (g/mol) | 19,600 | 22,900 | 19,100 | 19,500 | 23,500 | 24,600 |
| Mn (g/mol) | 9,570 | 11,600 | 8,620 | 8,960 | 11,000 | 11,500 |
| Mw/Mn | 2.05 | 1.97 | 2.22 | 2.18 | 2.14 | 2.14 |

$T_m$ = Melting temperature; $T_{m1}$ is the primary melting temperature; $T_{m2}$ is the secondary melting temperature
$T_c$ = Crystallization temperature; $T_{c1}$ is the primary melting temperature; $T_{c2}$ is the secondary melting temperature
% Cryst. = Percent crystallinity
*Melt index was calculated from the following equation (see U.S. Pat. No. 6,335,410): $I_2$ (190° C./2.16 kg) = $3.6126[10^{(log(\eta) - 6.6928)/-1.1363}] - 9.3185$, where $\eta$ = melt viscosity, in cP, at 350° F.

Results of Characterization:

As it can be seen in the above results, the melt index of the "1000 MI" base polymer decreases by 35-48% after maleation, and the "500 MI" base polymer decreases by 27-33% after maleation. This is an unexpected finding, especially for the "500 MI" base polymer, which maintains a relatively high melt index, and thus, a relatively low molecular weight. In adhesive formulations, it is important to maintain a relatively high melt index, above 300 g/10 min at 350° F., in order to formulate adhesives with sufficiently low viscosities, acceptable for processibility. It is difficult to formulate adhesives with good processibility, based on a polymer with a melt index less than 300 g/10 min at 350° F. Additional maleation results are shown in Table 4 below.

TABLE 4

Additional Maleation Results

| Base Polymer Melt Index* 190° C./2.16 kg (g/10 min) | % MAH by FTIR | Viscosity (cP) 350° F. | MAH Grafted Polymer Melt Index* 190° C./2.16 kg (g/10 min) | % Increase in Viscosity | % Decrease in Melt Index |
|---|---|---|---|---|---|
| 1072 | 0.558 | 11308 | 750 | 49 | 30 |
| 1072 | 0.142 | 9258 | 897 | 22 | 16 |
| 501 | 0.501 | 30543 | 308 | 72 | 39 |
| 501 | 0.187 | 20596 | 439 | 16 | 12 |
| 221 | 0.410 | 86281 | 118 | 97 | 47 |
| 221 | 0.145 | 53688 | 184 | 23 | 17 |

Viscosities of base polymers at 350° F. were as follows:
1000 MI EO1 = 7574 cP;
500 MI EO2 = 17786 cP;
200 MI EO3 = 43791 cP.

*Melt index was calculated from the following equation (see U.S. Pat. No. 6,335,410): $I_2$ (190° C./2.16 kg) = $3.6126[10^{(log(\eta) - 6.6928)/-1.1363}] - 9.3185$, where $\eta$ = melt viscosity, in cP, at 350° F.

End Group Analysis

The end group analyses as determined by $^1$H NMR for the EO2 copolymer and the EO1 copolymer are shown in Table 5. EO2, as discussed above, is a random ethylene/octene copolymer with a density of 0.874 g/cc, a melt viscosity of 15,747 cP at 350° F. (177° C.), an apparent melt index ($I_2$) of 558 g/10 min at 190° C./2.16 kg, and a percent crystallinity around 18. EO1, as discussed above, is a random ethylene/octene copolymer with a density of 0.87 g/cc, a melt viscosity of 8200 cP at 350° F. (177° C.), an apparent melt index ($I_2$) of 1037 g/10 min at 190° C./2.16 kg, and a percent crystallinity around 16. The EO2 sample was analyzed twice.

TABLE 5

$^1$H NMR Results of the EO2 and EO1 Copolymers

| vinyl/ 1000 C | (cis/trans)vinylene/ 1000 C | vinylidene/ 1000 C | $R_v$ |
|---|---|---|---|
| 0.018 (EO2) | 0.087 (EO2) | 0.079 (EO2) | 0.096 (EO2) |
| 0.011 (EO2) | 0.055 (EO2) | 0.052 (EO2) | 0.093 (EO2) |
| 0.010 (EO1) | 0.039 (EO1) | 0.036 (EO1) | 0.118 (EO1) |

We claim:

1. A composition comprising at least one functionalized functionalized ethylene/α-olefin interpolymer, and wherein the at least one functionalized ethylene interpolymer is formed from a reactive composition comprising an ethylene/α-olefin interpolymer, at least one unsaturated compound containing at least one heteroatom, and at least one initiator, and wherein the ethylene/α-olefin interpolymer contains greater than 50 mole percent polymerized ethylene monomers, based on total moles polymerizable monomers, and an α-olefin, and wherein the ethylene/α-olefin interpolymer has a melt viscosity less than 50,000 cP at 350° F. (177° C.), a molecular weight distribution ($M_w/M_n$) from 1 to 5, a melt index (I2) from greater than 300 to 3,500 g/10 min, and a density from 0.865 to 0.895 g/cm$^3$, and wherein the α-olefin is selected from propylene, 1-butene, 1-hexene and 1-octene, and wherein the at least one functionalized ethylene/α-olefin interpolymer is present in an amount from 15 to 50 weight percent, based on the total weight of the composition, and wherein the composition further comprises from 5 to 35 weight percent of at least one tackifier, based on the total weight of the composition, and from 5 to 35 weight percent of at least one oil or at least one wax, based on the total weight of the composition; and wherein the at least one functionalized ethylene/α-olefin interpolymer has a number average molecular weight (Mn) from 4,000 to 30,000 g/mole, and wherein the at least one unsaturated compound is a carbonyl-containing compound, and wherein the weight ratio of the carbonyl-containing compound to the at least one initiator is from 10:1 to 500:1, and wherein the carbonyl-containing compound is present in an amount of at least 1.0 weight percent, based on the total weight of the reactive composition, and the at least one initiator is present in an amount from 500 ppm to 2200 ppm, based on the total weight of the reactive composition.

2. The composition of claim 1, wherein the carbonyl-containing compound is selected from the group consisting of maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

3. The composition of claim 1, wherein the ethylene/α-olefin interpolymer has at least one melting temperature from 50° C. to 90° C.

4. The composition of claim 1, wherein the ethylene/α-olefin interpolymer contains an Rv, a ratio of terminal vinyl groups to the sum of all unsaturation, from 0.01 to 0.4, as determined by $^1$H NMR.

5. The composition of claim 1, wherein the carbonyl-containing compound is maleic anhydride, and wherein the weight ratio of the maleic anhydride to the initiator is from 10:1 to 50:1.

6. The composition of claim 1, wherein the ethylene/α-olefin interpolymer has a molecular weight distribution from about 1 to 3.

7. The composition of claim 1, wherein the at least one functionalized ethylene/α-olefin interpolymer has a weight average molecular weight (Mw) from 8,000 to 60,000 g/mole.

8. The composition of claim 1, wherein the at least one functionalized ethylene/α-olefin interpolymer has a density from 0.86 g/cm$^3$ to 0.90 g/cm$^3$.

9. The composition of claim 1, wherein the at least one initiator is present in an amount from 1000 ppm to 2000 ppm.

10. The composition of claim 1, wherein the ethylene/α-olefin interpolymer has a melt index (I2) from greater than 400 g/10 min.

11. An article comprising at least one component formed from the composition of claim 1.

12. An article comprising wood and at least one component formed from the composition of claim 1.

* * * * *